US007835987B2

(12) United States Patent
Daley et al.

(10) Patent No.: US 7,835,987 B2
(45) Date of Patent: Nov. 16, 2010

(54) SYSTEM AND METHOD FOR ROUTING A TRADING ORDER ACCORDING TO PRICE

(75) Inventors: Thomas J. Daley, McKinney, TX (US); Pavan K. Garapati, Plano, TX (US)

(73) Assignee: BGC Partners, Inc., New York, NY (US)

( * ) Notice: Subject to any disclaimer, the term of this patent is extended or adjusted under 35 U.S.C. 154(b) by 1625 days.

(21) Appl. No.: 10/767,588

(22) Filed: Jan. 29, 2004

(65) Prior Publication Data

US 2005/0171889 A1    Aug. 4, 2005

(51) Int. Cl.
*G06Q 40/00*    (2006.01)
(52) U.S. Cl. .......................................... 705/40; 705/41
(58) Field of Classification Search .................. 705/37, 705/40–41
See application file for complete search history.

(56) References Cited

U.S. PATENT DOCUMENTS

| | | | |
|---|---|---|---|
| 3,573,747 A | 4/1971 | Adams et al. | 340/172.5 |
| 3,581,072 A | 5/1971 | Nymeyer | 235/152 |
| 4,412,287 A | 10/1983 | Braddock, III | 364/408 |
| 5,077,665 A | 12/1991 | Silverman et al. | 364/408 |
| 5,101,353 A | 3/1992 | Lupien et al. | |
| 5,136,501 A | 8/1992 | Silverman et al. | 364/408 |
| 5,297,031 A | 3/1994 | Gutterman et al. | 364/408 |
| 5,305,200 A | 4/1994 | Hartheimer et al. | 364/408 |
| 5,375,055 A | 12/1994 | Togher et al. | 364/408 |
| 5,717,989 A | 2/1998 | Tozzoli et al. | |
| 5,727,165 A | 3/1998 | Ordish et al. | 395/237 |
| 5,787,402 A | 7/1998 | Potter et al. | |
| 5,794,207 A | 8/1998 | Walker et al. | 705/23 |
| 5,873,071 A | 2/1999 | Ferstenberg et al. | 705/37 |
| 5,915,245 A | 6/1999 | Patterson, Jr. et al. | 705/35 |
| 5,930,762 A | 7/1999 | Masch | |

(Continued)

FOREIGN PATENT DOCUMENTS

EP    0 388 162 A2    3/1990

(Continued)

OTHER PUBLICATIONS

*European Patent Office Communication* for Application No. 05712564.3-1238; 3 pages, Jan. 8, 2007.

(Continued)

*Primary Examiner*—Thu Thao Havan
(74) *Attorney, Agent, or Firm*—Ruth J. Ma

(57) ABSTRACT

A system for routing a trading order to a market center according to price comprises a memory and a processor. The memory stores policy information, cost information, and rebate information associated with a plurality of market centers. The processor receives a trading order specifying a trading product, a plurality of market center prices for the trading order, and best price information for the trading product. The processor adjusts at least one market center price according to the policy information of the corresponding market center and the best price information. The processor also adjusts at least one market center price according to at least one of the cost information and the rebate information of the corresponding market center. The processor then compares the plurality of market center prices, and selects a particular market center based at least in part upon the comparison.

21 Claims, 9 Drawing Sheets

U.S. PATENT DOCUMENTS

| | | | |
|---|---|---|---|
| 5,950,177 A | 9/1999 | Lupien et al. | 705/37 |
| 5,970,479 A | 10/1999 | Shepherd | 705/37 |
| 6,012,046 A | 1/2000 | Lupien et al. | 705/37 |
| 6,014,643 A | 1/2000 | Minton | 705/37 |
| 6,058,379 A | 5/2000 | Odom et al. | 705/37 |
| 6,098,051 A | 8/2000 | Lupien et al. | 705/37 |
| 6,141,653 A | 10/2000 | Conklin et al. | |
| 6,173,270 B1 | 1/2001 | Cristofich et al. | |
| 6,236,972 B1 | 5/2001 | Shkedy | 705/1 |
| 6,247,000 B1 | 6/2001 | Hawkins et al. | 705/37 |
| 6,278,982 B1 | 8/2001 | Korhammer et al. | 705/37 |
| 6,393,409 B2 | 5/2002 | Young et al. | |
| 6,405,180 B2 | 6/2002 | Tilfors et al. | 705/37 |
| 6,408,282 B1 | 6/2002 | Buist | 705/37 |
| 6,418,419 B1 | 7/2002 | Nieboer et al. | 705/37 |
| 6,421,653 B1 | 7/2002 | May | 705/37 |
| 6,505,175 B1 | 1/2003 | Silverman et al. | 705/37 |
| 6,532,460 B1 | 3/2003 | Amanat et al. | |
| H2064 H | 5/2003 | Buchalter | 705/37 |
| 6,601,044 B1 | 7/2003 | Wallman | 705/36 |
| 6,606,744 B1 | 8/2003 | Mikurak | |
| 6,615,188 B1 | 9/2003 | Breen et al. | |
| 6,618,707 B1 | 9/2003 | Gary | 705/37 |
| 6,625,583 B1 | 9/2003 | Silverman et al. | |
| 6,629,082 B1 | 9/2003 | Hambrecht et al. | 705/37 |
| 6,772,132 B1 | 8/2004 | Kemp, II et al. | |
| 6,829,589 B1 | 12/2004 | Saliba | |
| 6,909,941 B2 | 6/2005 | Scott et al. | |
| 6,938,011 B1 | 8/2005 | Kemp, II et al. | |
| 6,963,856 B2 | 11/2005 | Lutnick et al. | |
| 7,035,820 B2 | 4/2006 | Goodwin et al. | |
| 7,058,602 B1 | 6/2006 | La Mura et al. | |
| 7,110,969 B1 | 9/2006 | Bennett et al. | 705/35 |
| 7,152,037 B2 | 12/2006 | Smith | |
| 7,162,447 B1 | 1/2007 | Cushing | |
| 7,181,419 B1 | 2/2007 | Mesaros | |
| 7,197,483 B2 | 3/2007 | Brady et al. | 705/37 |
| 7,213,000 B2 | 5/2007 | Gutierrez et al. | |
| 7,242,669 B2 | 7/2007 | Bundy et al. | 370/252 |
| 7,246,092 B1 | 7/2007 | Peterson et al. | 705/37 |
| 7,310,620 B2 | 12/2007 | Moore et al. | |
| 7,392,214 B1 | 6/2008 | Fraser et al. | |
| 7,401,044 B1 | 7/2008 | Fraser et al. | |
| 7,536,338 B2 | 5/2009 | Guler et al. | |
| 2001/0037284 A1 | 11/2001 | Finkelstein et al. | 705/37 |
| 2001/0042040 A1 | 11/2001 | Keith | 705/37 |
| 2001/0049651 A1 | 12/2001 | Selleck | |
| 2001/0051909 A1 | 12/2001 | Keith | 705/37 |
| 2001/0056396 A1 | 12/2001 | Goino | |
| 2002/0010672 A1 | 1/2002 | Waelbroeck et al. | 705/37 |
| 2002/0016758 A1 | 2/2002 | Grigsby | 705/36 |
| 2002/0023037 A1 | 2/2002 | White, Jr. | 705/37 |
| 2002/0046127 A1 | 4/2002 | Reding et al. | |
| 2002/0052822 A1 | 5/2002 | Terashima | |
| 2002/0052827 A1 | 5/2002 | Waelbroeck et al. | 705/37 |
| 2002/0055901 A1 | 5/2002 | Gianakouros et al. | 705/37 |
| 2002/0073016 A1 | 6/2002 | Furbush et al. | 705/37 |
| 2002/0087451 A1 | 7/2002 | Rieger et al. | |
| 2002/0091606 A1 | 7/2002 | Shapiro | 705/36 |
| 2002/0099640 A1 | 7/2002 | Lange | |
| 2002/0156719 A1 | 10/2002 | Finebaum et al. | 705/37 |
| 2002/0169703 A1 | 11/2002 | Lutnick et al. | |
| 2002/0178104 A1 | 11/2002 | Hausman | 705/37 |
| 2002/0188548 A1 | 12/2002 | Bunda | |
| 2002/0198816 A1 | 12/2002 | Gilbert et al. | 705/37 |
| 2003/0004858 A1 | 1/2003 | Schmitz et al. | |
| 2003/0009411 A1 | 1/2003 | Ram et al. | |
| 2003/0009412 A1 | 1/2003 | Furbush et al. | |
| 2003/0009413 A1 | 1/2003 | Furbush et al. | 705/37 |
| 2003/0014351 A1 | 1/2003 | Neff et al. | |
| 2003/0093343 A1 | 5/2003 | Huttenlocher et al. | |
| 2003/0097325 A1 | 5/2003 | Friesen et al. | 705/37 |
| 2003/0101128 A1 | 5/2003 | Abernethy | 705/37 |
| 2003/0149636 A1 | 8/2003 | Lutnick et al. | |
| 2003/0167224 A1 | 9/2003 | Periwal | 705/37 |
| 2003/0172024 A1 | 9/2003 | Kokis et al. | |
| 2003/0177086 A1 | 9/2003 | Gomber et al. | 705/37 |
| 2003/0216932 A1 | 11/2003 | Foley | 705/1 |
| 2003/0220867 A1 | 11/2003 | Goodwin et al. | |
| 2003/0225646 A1 | 12/2003 | Failla et al. | |
| 2003/0225674 A1 | 12/2003 | Hughes et al. | |
| 2003/0229557 A1 | 12/2003 | Richmann et al. | |
| 2004/0019551 A1 | 1/2004 | Martyn et al. | |
| 2004/0024684 A1 | 2/2004 | Montepeque | |
| 2004/0034591 A1 | 2/2004 | Waelbroeck et al. | 705/37 |
| 2004/0059666 A1 | 3/2004 | Waelbroeck et al. | 705/37 |
| 2004/0103054 A1 | 5/2004 | Singer | |
| 2004/0143538 A1 | 7/2004 | Korhammer et al. | 705/37 |
| 2004/0177024 A1 | 9/2004 | Bok et al. | |
| 2004/0210505 A1* | 10/2004 | Pourhamid | 705/37 |
| 2004/0210511 A1 | 10/2004 | Waelbroeck et al. | |
| 2004/0210512 A1 | 10/2004 | Fraser et al. | |
| 2004/0210514 A1 | 10/2004 | Kemp et al. | |
| 2004/0215538 A1 | 10/2004 | Smith et al. | 705/35 |
| 2004/0236636 A1 | 11/2004 | Lutnick et al. | 705/26 |
| 2004/0236662 A1* | 11/2004 | Korhammer et al. | 705/37 |
| 2005/0017710 A1 | 1/2005 | Steinich et al. | 324/207.13 |
| 2005/0027635 A1 | 2/2005 | Monroe et al. | |
| 2005/0044031 A1 | 2/2005 | Lebedev | 705/37 |
| 2005/0055304 A1 | 3/2005 | Lutnick et al. | 705/37 |
| 2005/0055305 A1 | 3/2005 | Lutnick et al. | 705/37 |
| 2005/0075898 A1 | 4/2005 | Wasserman et al. | |
| 2005/0108141 A1 | 5/2005 | Farrell et al. | 705/37 |
| 2005/0119966 A1 | 6/2005 | Sandholm et al. | |
| 2005/0160032 A1 | 7/2005 | Lutnick et al. | |
| 2005/0171887 A1 | 8/2005 | Daley et al. | 705/37 |
| 2005/0171888 A1 | 8/2005 | Daley et al. | 705/37 |
| 2005/0171890 A1 | 8/2005 | Daley et al. | 705/37 |
| 2005/0171891 A1 | 8/2005 | Daley et al. | 705/37 |
| 2005/0289043 A1 | 12/2005 | Maudlin | |
| 2006/0015436 A1 | 1/2006 | Burns et al. | 705/37 |
| 2006/0015441 A1 | 1/2006 | Burkhardt et al. | 705/37 |
| 2006/0026090 A1 | 2/2006 | Balabon | 705/37 |
| 2006/0059079 A1 | 3/2006 | Howorka | 705/37 |
| 2006/0080222 A1 | 4/2006 | Lutnick et al. | |
| 2006/0136318 A1 | 6/2006 | Rafieyan et al. | |
| 2006/0149662 A1 | 7/2006 | Nordlicht et al. | 705/37 |
| 2006/0190386 A1 | 8/2006 | Levy | 705/37 |
| 2006/0253379 A1 | 11/2006 | Adcock et al. | 705/37 |
| 2006/0253382 A1 | 11/2006 | Adcock et al. | 705/37 |
| 2007/0005484 A1 | 1/2007 | Waelbroeck et al. | |
| 2007/0100734 A1 | 5/2007 | Berger et al. | |
| 2007/0118464 A1 | 5/2007 | Avery | 705/37 |
| 2007/0130048 A1 | 6/2007 | Claus et al. | |
| 2007/0130050 A1 | 6/2007 | Claus et al. | |
| 2007/0156574 A1 | 7/2007 | Marynowski et al. | 705/37 |
| 2007/0156754 A1 | 7/2007 | Busch et al. | |
| 2007/0219898 A1 | 9/2007 | Burkhardt et al. | |
| 2008/0015974 A1 | 1/2008 | Balabon | 705/37 |

FOREIGN PATENT DOCUMENTS

| | | |
|---|---|---|
| EP | 0 388 162 A3 | 3/1990 |
| EP | 1081614 A2 | 3/2001 |
| GB | 2 389 687 A | 12/2003 |
| GB | 2 411 492 A | 8/2005 |
| JP | 2002-183446 | 6/2002 |
| JP | 2002-203112 | 7/2002 |
| JP | 2003-058733 | 2/2003 |
| JP | 2003-058741 | 2/2003 |
| JP | 2003345987 | 12/2003 |
| WO | WO 00/11587 A1 | 3/2000 |
| WO | WO 00/26834 A2 | 5/2000 |
| WO | WO 00/26834 A3 | 5/2000 |

| | | |
|---|---|---|
| WO | WO 01/09757 A2 | 2/2001 |
| WO | WO 01/25996 A1 | 4/2001 |
| WO | WO 01/48655 A1 | 7/2001 |
| WO | WO 01/52150 A1 | 7/2001 |
| WO | WO 01/54037 A1 | 7/2001 |
| WO | WO 01/75752 A2 | 10/2001 |
| WO | WO 01/93169 A1 | 12/2001 |
| WO | WO 02/071297 A1 | 9/2002 |
| WO | WO 02/086657 A2 | 10/2002 |
| WO | WO 2005/083603 A1 | 9/2005 |

OTHER PUBLICATIONS

*European Patent Office Examination Report* for Application No. 05 712 564.3-1238; 5 pages, Nov. 14, 2007.
*Notification of Transmittal of the International Search Report and the Written Opinion of the International Searching Authority, or the Declaration* for International Application No. PCT/US05/03164, 6 pages, Dec. 13, 2006.
*Notification of Transmittal of the International Search Report and the Written Opinion of the International Searching Authority, or the Declaration* for International Application No. PCT/US05/03163; 9 pages, Jan. 4, 2007.
*Notification of Transmittal of the International Search Report and the Written Opinion of the International Searching Authority, or the Declaration* for International Application No. PCT/US05/03168; 6 pages, Jan. 29, 2007.
*USPTO Office Action Summary* for U.S. Appl. No. 10/767,699, filed Jan. 29, 2004; 22 pages, Oct. 26, 2007.
Parlour, Christine; *Price Dynamics in Limit Order Markets*; Queen's University, Kingston, Ontario, Canada; 111 pages, Nov. 1995.
Weber, Bruce; *Screen-Based Trading in Futures Markets: Recent Developments and Research Propositions*; Abstract; ISBN 0 7695 0001 3; 1 page, 1999.
*Balance of Trade*; Banking Technology; vol. 20, No. 9; ISSN 0266-0865; pp. 42-44, Nov. 2004.
Patent Pending U.S. Appl. No. 11/499,833 entitled *System and Method for Matching Trading Orders Based on Priority* by Matthew W. Claus, et al.; 46 total pages, filed Aug. 3, 2006.
Notification of Transmittal of The International Search Report, International Application No. PCT/US05/03159, 4 pages, Feb. 24, 2006.
Written Opinion of the International Searching Authority, International Application No. PCT/US05/03159, 7 pages, Feb. 24, 2006.
How to Match Trades and Quotes for NYSE Stocks? Olivier Vergote and K.U. Leuven, Abstract, 21 pages, Mar. 2005.
Notification of Transmittal of the International Search Report for Application No. PCT/US05/03166; 4 pages, Nov. 4, 2005.
Written Opinion of the International Searching Authority for Application No. PCT/US05/03166; 5 pages, Nov. 4, 2005.
Patent Pending Application entitled, "System and Method for Routing a Trading Order," by Thomas J. Daley et al., 64 pages including drawings, filing date Jan. 29, 2004.
Patent Pending Application entitled, "System and Method for Controlling the Disclosure of a Trading Order," by Thomas J. Daley et al., 66 pages including drawings, filing date Jan. 29, 2004.
Patent Pending Application entitled, "System and Method for Avoiding Transaction Costs Associated with Trading Orders," by Thomas J. Daley et al., 65 pages including drawings, filing date Jan. 29, 2004.
Patent Pending Application entitled, "System and Method for Matching Trading Orders," by Thomas J. Daley et al., 74 pages including drawings, filing date Jan. 29, 2004.
*Notification of Transmittal of the International Search Report and the Written Opinion of the International Searching Authority* for International Application No. PCT/US06/30638; 8 pages, Apr. 20, 2007.
*United States Patent and Trademark Office;* Office Action for U.S. Appl. No. 10/767,546, filed Jan. 29, 2004 in the name of Thomas J. Daley; 48 pages, Feb. 4, 2008.
*United States Patent and Trademark Office;* Office Action for U.S. Appl. No. 10/766,965, filed Jan. 29, 2004 in the name of Thomas J. Daley; 49 pages, Feb. 7, 2008.
*United States Patent and Trademark Office;* Office Action for U.S. Appl. No. 10/767,649, filed Jan. 29, 2004 in the name of Thomas J. Daley; 38 pages, Mar. 3, 2008.

*United States Patent and Trademark Office;* Office Action for U.S. Appl. No. 11/499,833, filed Aug. 3, 2006 in the name of Matthew W. Claus; 14 pages, May 19, 2008.
C. Ebeling et al.; Validating VLSI Circuit Layout by Wirelist Comparison; Sep. 1983; In Proceedings of the IEEE International Conference on Computer Aided Design (ICCAD-83), pp. 172-173.
Ohlrich et al.; "sub-Gemini: Identifying subcircuits Using a Fast Subgraph Isomorphism Algorithm"; Jun. 1993; In proceedings of the 30th IEEE/ACM Design Automation Conference 7 pages.
Ebeling; "Gemini II: A Second Generation Layout Validation Program"; 1988; In proceedings of the IEEE International Conference on Computer Aided Design (ICCAD-88), pp. 322-325.
Notification of Transmittal of International Search report and Written opinion for PCT Application No. PCT/US06/30636; Apr. 30, 2007; 8 pages.
USPTO Office Action for U.S. Appl. No. 11/499,496, dated May 1, 2008 (12 pages).
USPTO Office Action for U.S. Appl. No. 10/767,546, Oct. 29, 2008, 35 pages.
USPTO Office Action for U.S. Appl. No. 11/499,496, dated Apr. 27, 2009 (3 pages).
USPTO Office Action for U.S. Appl. No. 11/499,496, dated Jan. 26, 2009 (16 pages).
USPTO Office Action for U.S. Appl. No. 11/499,833, dated May 19, 2008 (12 pages).
USPTO Office Action for U.S. Appl. No. 11/499,833, dated Nov. 14, 2008 (14 pages).
USPTO Office Action for U.S. Appl. No. 11/499,833, dated Aug. 18, 2009 (15 pages).
USPTO Office Action for U.S. Appl. No. 10/766,965, Nov. 21, 2008 (20 pages).
Australian Examiner's Report for AU Application No. 2006278384 dated, Aug. 5, 2009 (3 pages).
USPTO Office Action for U.S. Appl. No. 10/767,546, Oct. 7, 2009 (19 pages).
USPTO Office Action for U.S. Appl. No. 10/767,699, Oct. 20, 2008 (3 pages).
USPTO Examiner Interview Summary for U.S. Appl. No. 10/766,965, Sep. 22, 2009 (2 pages).
USPTO Office Action for U.S. Appl. No. 10/766,965, Oct. 28, 2009 (2 pages).
USPTO Examiner Interview Summary for U.S. Appl. No. 10/767,649, Jun. 23, 2009 (2 pages).
USPTO Examiner Interview Summary for U.S. Appl. No. 11/499,833, dated Sep. 3, 2009 (2 pages).
USPTO Examiner Interview Summary for U.S. Appl. No. 11/499,496, dated Jul. 27, 2009 (4 pages).
U.S. Appl. No. 60/706,109, filed Aug. 5, 2005, Noviello.
Australian Examiner's Report for Application No. 2005208980, dated Nov. 17, 2009 (2 pages).
Australian Examiner's Report for Application No. 2005208978, dated Nov. 26, 2009 (1 page).
Australian Examiner's Report for Application No. 2005208981, dated Dec. 14, 2009 (3 pages).
USPTO Office Action for U.S. Appl. No. 10/767,649, Aug. 27, 2009 (20 pages).
USPTO Examiner Interview Summary for U.S. Appl. No. 10/767,699, Dec. 23, 2009 (3 pages).
USPTO Examiner's Answer to Appeal Brief for U.S. Appl. No. 10/767,699, Dec. 24, 2009 (16 pages).
USPTO Examiner's Answer to Appeal Brief for U.S. Appl. No. 10/766,965, Jan. 20, 2010 (19 pages).
USPTO Notice of Allowance and Fees Due and Examiner Interview Summary for U.S. Appl. No. 11/499,496, dated Feb. 17, 2010 (89 pages).
George Simon & Kathryn Trikla, "The Regulation of Specialists and Implications for the Future," Business Lawyer, Nov. 2005, pp. 217-387.
The 'Hybrid Approach': A review of NYSE's Market Structure Proposal, Mondaq Business Briefing, NA, Dec. 9, 2004.
Australian Examiner's Report for Application No. 2006278382, dated Jul. 9, 2009 (3 pages).

USPTO Notice of Allowance and Fees Due for U.S. Appl. No. 11/499,833, dated Mar. 12, 2010 (9 pages).

New AZX Session, Trader's v10 n130, Oct. 1997, p. 4 (p. 20 of EIC search).

The New Trading Landscape for Institutional Investors, Institutional Trades Can Be Costly If Investors Aren't Careful, Norman Harris, Institutional Investor 36, 5, S1 (7) May 2002 (p. 21 of EIC search).

Scientific and Technical Information Center's Search Report EIC 3600, dated Jul. 9, 2009 (88 pages).

International Preliminary Report on Patentability for PCT Application No. PCT/US05/03164, dated Jan. 9, 2007 (4 pages).

Japanese Office Action with English translation for Application No. 2006-551589, dated Apr. 20, 2010 (6 pages).

International Preliminary Report on Patentability for PCT Application No. PCT/US05/03166, dated Jul. 31, 2006 (4 pages).

Japanese Office Action with English translation for Application No. 2006-551590, dated Apr. 20, 2010 (6 pages).

International Preliminary Report on Patentability for PCT Application No. PCT/US05/03163, dated Jan. 23, 2007 (5 pages).

Japanese Office Action with English translation for Application No. 2006-551588, dated Apr. 27, 2010 (8 pages).

International Preliminary Report on Patentability for PCT Application No. PCT/US05/03168, dated Feb. 13, 2007 (4 pages).

Japanese Office Action with English translation for Application No. 2006-551591, dated Apr. 20, 2010 (6 pages).

International Preliminary Report on Patentability for PCT Application No. PCT/US05/03159, dated Jul. 31, 2006 (6 pages).

Supplementary European Search Report for Application No. EP 05712558, dated Dec. 5, 2008 (2 pages).

Japanese Office Action with English translation for Application No. 2006-551587, dated Apr. 20, 2010 (6 pages).

International Preliminary Report on Patentability for PCT Application No. PCT/US06/30638, dated Feb. 5, 2008 (5 pages).

International Preliminary Report on Patentability for PCT Application No. PCT/US06/30636, dated Feb. 5, 2008 (5 pages).

Donald L. Luskin, Index Options & Futures: The Complete Guide, Toyo Keizai, Inc., Aug. 9, 1990, p. 32-35 [translation of an English book, originally published by John Wiley & Sons, Inc., 1987].

EPO: "Mitteilung des Europaischen Patentamts vom 1. Oktober 2007 Ober Geschaftsmethoden =Notice from the European Patent Office dated Oct. 1, 2007 concerning business methods =Communique de l'Office europeen des brevets,en date du 1 er octobre 2007, concernant les methodes dans le domaine des activites"Journal Officiel de l'Office Europeen des Brevets.Official Journal of the European Patent Office.Amtsblattt des Europaeischen Patentamts, OEB, Munchen, DE, vol. 30, No. 11, Nov. 1, 2007, pp. 592-593, XP0079055251 SSN: 0170-9291 (2 pages).

USPTO Supplemental Notice of Allowance and Fees Due for U.S. Appl. No. 11/499,496, dated May 26, 2010 (4 pages).

USPTO Dismissal of Appeal for U.S. Appl. No. 10/766,965, Jun. 7, 2010 (3 pages).

European Patent Office Communication and Official Action for Application No. 05712562.7, dated May 18, 2010 (6 pages).

European Patent Office Communication and Official Action for Application No. 05712563.5, dated May 18, 2010 (6 pages).

European Patent Office Communication and Official Action for Application No. 05712558.5, dated May 18, 2010 (6 pages).

Australian Examiner's Report for Application No. 2005208979, dated Nov. 13, 2009 (2 pages).

European Patent Office Communication and Extended European Search Report for Application No. 06789488.1, dated Jul. 6, 2010 (10 pages).

European Patent Office Communication and Extended European Search Report for Application No. 06789490.7, dated Jul. 7, 2010 (8 pages).

Australian Examiner's Report for Application No. 2005208977, dated Nov. 20, 2009 (8 pages).

USPTO Office Action for U.S. Appl. No. 10/767,546, Aug. 6, 2010 (39 pages).

USPTO Supplemental Notice of Allowance and Fees Due for U.S. Appl. No. 11/499,496, dated Jul. 23, 2010 (9 pages).

USPTO Supplemental Notice of Allowance and Fees Due for U.S. Appl. No. 11/499496, dated Aug. 10, 2010 (4 pages).

Japanese Office Action with English translation for Application No. 2006-551591, dated Aug. 24, 2010 (4 pages).

Japanese Office Action with English translation for Application No. 2006-551590, dated Aug. 24, 2010 (6 pages).

Japanese Office Action with English translation for Application No. 2006-551588, dated Aug. 31, 2010 (8 pages).

Japanese Office Action with English translation for Application No. 2006-551589, dated Aug. 31, 2010 (7 pages).

USPTO Notice of Allowance and Fees Due for U.S. Appl. No. 11/499,833, dated Sep. 15, 2010 (10 pages).

* cited by examiner

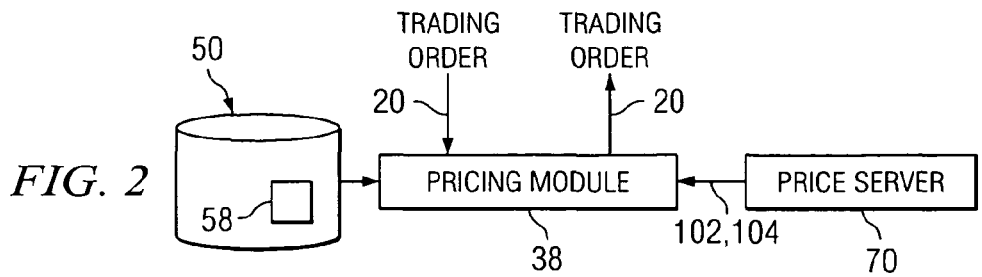
*FIG. 2*
| MARKET CENTER 18 | UNADJUSTED MARKET CENTER PRICE 102 | BEST PRICE POLICY 106 | COST INFORMATION 108 | REBATE INFORMATION 110 | ADJUSTED MARKET CENTER PRICE 112 |
|---|---|---|---|---|---|
| ARCA | 9.250 x 10.010 | NONE | 0.003 | 0.000 | 9.247 x 10.013 |
| ISLD | 9.260 x 10.020 | NONE | 0.000 | 0.003 | 9.263 x 10.017 |
| NITE | 9.000 x 10.050 | MATCH | 0.000 | 0.000 | 9.500 x 10.000 |
| MWSE | 9.000 x 10.060 | SPLIT | 0.001 | 0.000 | 9.749 x 9.751 |
| BRUT | 9.500 x 10.000 | NONE | 0.004 | 0.000 | 9.496 x 10.004 |
*FIG. 3*
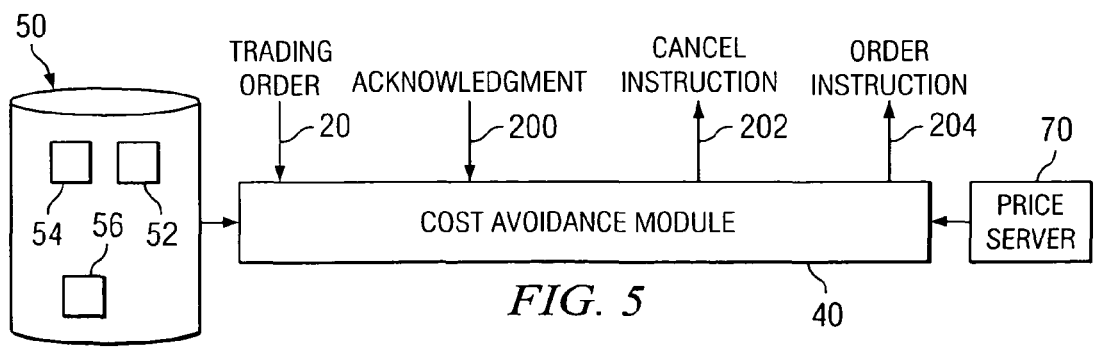
*FIG. 5*

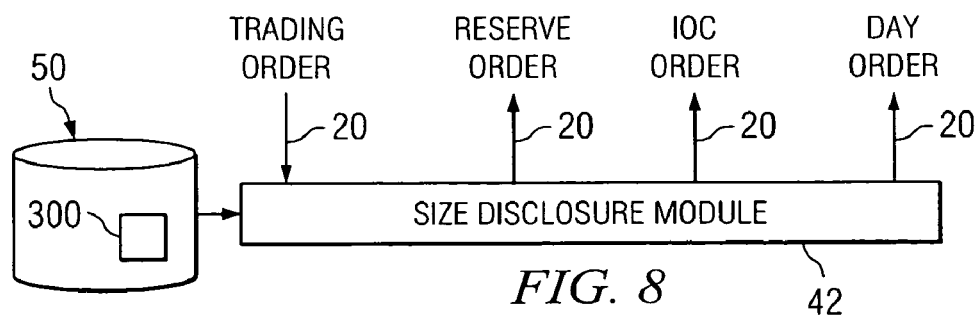
FIG. 8
| MARKET CENTER | DISCLOSURE POLICY |
|---|---|
| ARCA | PROP |
| ISLD | IOC |
| NITE | NOIOC |
| MWSE | NOIOC |
| BRUT | IOC |
| ⋮ | ⋮ |
FIG. 9
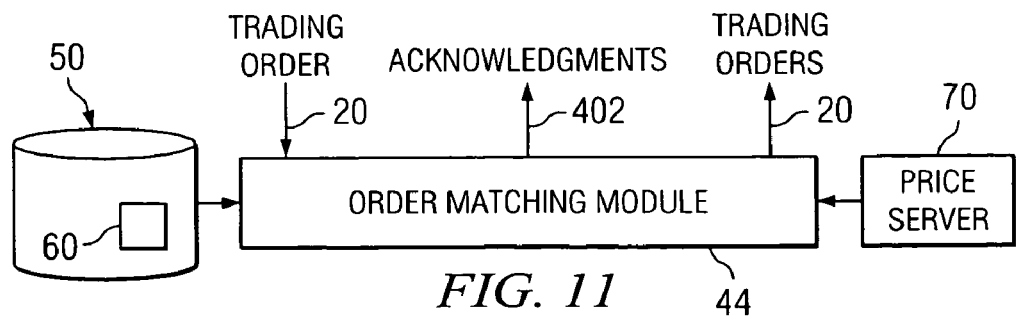
FIG. 11

| 410 | 412 | 414 | 416 | 418 | 420 | 422 | 424 | 426 | 428 |
|---|---|---|---|---|---|---|---|---|---|
| | | BID | | | | | OFFER | | |
| PRODUCT | QUANTITY | SOURCE | PRICE | STATUS | PRODUCT | QUANTITY | SOURCE | PRICE | STATUS |
| ... | ... | ... | ... | ... | ... | ... | ... | ... | ... |
| XYZ STOCK | 1,000 | TRADER 2 | 10.02 | MATCHED | XYZ STOCK | 29,000 | TRADER 1 | 9.98 | OPEN |
| XYZ STOCK | 2,000 | TRADER 3 | 10.02 | MATCHED | XYZ STOCK | 5,000 | ISLD | 10.05 | OPEN |
| XYZ STOCK | 6,000 | ARCA | 10.01 | PENDING | XYZ STOCK | 2,000 | ARCA | 10.10 | OPEN |
| XYZ STOCK | 7,000 | ISLD | 10.01 | OPEN | XYZ STOCK | 1,000 | ARCA | 10.11 | OPEN |
| XYZ STOCK | 2,000 | ARCA | 10.00 | OPEN | XYZ STOCK | 5,000 | NITE | 10.15 | OPEN |
| XYZ STOCK | 50,000 | TRADER 4 | 10.00 | MATCHED | XYZ STOCK | 5,000 | MWSE | 10.15 | OPEN |
| ... | ... | ... | ... | ... | ... | ... | ... | ... | ... |

*FIG. 12*

SYSTEM AND METHOD FOR ROUTING A TRADING ORDER ACCORDING TO PRICE

TECHNICAL FIELD OF THE INVENTION

The present invention relates generally to electronic trading and more specifically to a system for routing a trading order according to price.

BACKGROUND OF THE INVENTION

In recent years, electronic trading systems have gained wide spread acceptance for trading of a wide variety of items, such as goods, services, financial instruments, and commodities. For example, electronic trading systems have been created which facilitate the trading of financial instruments and commodities such as stocks, bonds, currency, futures contracts, oil, and gold.

Many of these electronic trading systems use a bid/offer process in which bids and offers are submitted to the systems by a passive side and then those bids and offers are hit or lifted (or taken) by an aggressive side. For example, a passive trading counterparty may submit a "bid" to buy a particular trading product. In response to such a bid, an aggressive side counterparty may submit a "hit" in order to indicate a willingness to sell the trading product to the first counterparty at the given price. Alternatively, a passive side counterparty may submit an "offer" to sell the particular trading product at the given price, and then the aggressive side counterparty may submit a "lift" (or "take") in response to the offer to indicate a willingness to buy the trading product from the passive side counterparty at the given price.

SUMMARY OF THE INVENTION

In accordance with the present invention, the disadvantages and problems associated with prior electronic trading systems have been substantially reduced or eliminated.

In accordance with one embodiment of the present invention, a system for routing a trading order to a market center comprises a memory and a processor. The memory stores a trading order specifying a trading product. The processor determines a plurality of market center prices for the trading product, each market center price associated with at least one of a plurality of market centers. The processor selects one of the plurality of market centers based upon the determined market center prices. The processor further determines a disclosure policy for the selected market center and routes the trading order to the selected market center according to the determined disclosure policy.

In accordance with another embodiment of the present invention, a system for routing a trading order to a market center according to price comprises a memory and a processor. The memory stores policy information, cost information, and rebate information associated with a plurality of market centers. The processor receives a trading order specifying a trading product, a plurality of market center prices for the trading order, and best price information for the trading product. The processor adjusts at least one market center price according to the policy information of the corresponding market center and the best price information. The processor also adjusts at least one market center price according to at least one of the cost information and the rebate information of the corresponding market center. The processor then compares the plurality of market center prices, and selects a particular market center based at least in part upon the comparison.

In accordance with another embodiment of the present invention, a system for controlling the disclosure of a trading order comprises a memory and a processor. The memory stores disclosure policies associated with market centers. The processor receives a trading order for a trading product that specifies a total quantity of the trading product and a maximum disclosure quantity of the trading product. The trading order is associated with a particular market center. The processor then routes the trading order to the particular market center according to the disclosure policy associated with the particular market center.

In accordance with another embodiment of the present invention, a system for avoiding transaction costs associated with trading orders comprises a memory and a processor. The memory stores an order identifier associated with a trading order, and a time threshold associated with the trading order. The processor monitors the length of time the trading order is active with a market center that is processing the trading order. The processor further determines a timeout when the length of time the trading order is active with the market center equals or exceeds the time threshold. The processor then communicates a cancel instruction for the trading order in response to determining the timeout.

In accordance with another embodiment of the present invention, a system for matching trading orders comprises a memory and a processor. The memory stores a plurality of bid requests for a trading product, each bid request is associated with at least one of a trader and a market center, a bid quantity for the trading product, and a bid price for the trading product. The processor receives a trading order specifying an offer request for the trading product, the trading order further specifying an offer quantity for the trading product and a target offer price for the trading product. The processor identifies at least one of the plurality of bid requests having a bid price that is greater than or equal to the target offer price. The processor then matches the offer request of the trading order with the at least one identified bid request if the identified bid request is associated with a trader, and routes the trading order to a particular market center if the at least one identified bid request is associated with the particular market center.

In accordance with still another embodiment of the present invention, a system for matching trading orders comprises a memory and a processor. The memory stores a plurality of offer requests for a trading product, each offer request associated with at least one of a trader and a market center, an offer quantity for the trading product, and an offer price for the trading product. The processor receives a trading order specifying a bid request for the trading product, the trading order further specifying a bid quantity for the trading product and a target bid price for the trading product. The processor identifies at least one of the plurality of offer requests having an offer price that is less than or equal to the target bid price. The processor then matches the bid request of the trading order with the at least one identified offer request if the identified offer request is associated with a trader, and routes the trading order to a particular market center if the at least one identified offer request is associated with the particular market center.

Various embodiments of the present invention may benefit from numerous advantages. It should be noted that one or more embodiments may benefit from some, none, or all of the advantages discussed below.

In general, the system of the present invention optimizes the processing of trading orders by internally matching trading orders within a trading exchange platform, filling trading orders using market centers, avoiding transaction costs associated with market centers, routing trading orders to particular market centers based upon the best achievable price, and controlling the disclosure of certain details of a trading order to market centers.

Other advantages will be readily apparent to one having ordinary skill in the art from the following figures, descriptions, and claims.

BRIEF DESCRIPTION OF THE DRAWINGS

For a more complete understanding of the present invention and its advantages, reference is now made to the following description, taken in conjunction with the accompanying drawings, in which:

FIG. 2 illustrates one embodiment of a pricing module of the system of FIG. 1;

FIG. 3 illustrates a table of information used by the pricing module;

FIG. 5 illustrates one embodiment of a cost avoidance module of the system of FIG. 1;

FIG. 8 illustrates one embodiment of a size disclosure module of the system of FIG. 1;

FIG. 9 illustrates a table of information used by the cost avoidance module;

FIG. 11 illustrates one embodiment of an order matching module;

FIG. 12 illustrates an order matching log used by the order matching module.

DETAILED DESCRIPTION OF EXAMPLE EMBODIMENTS OF THE INVENTION

Figure 1:
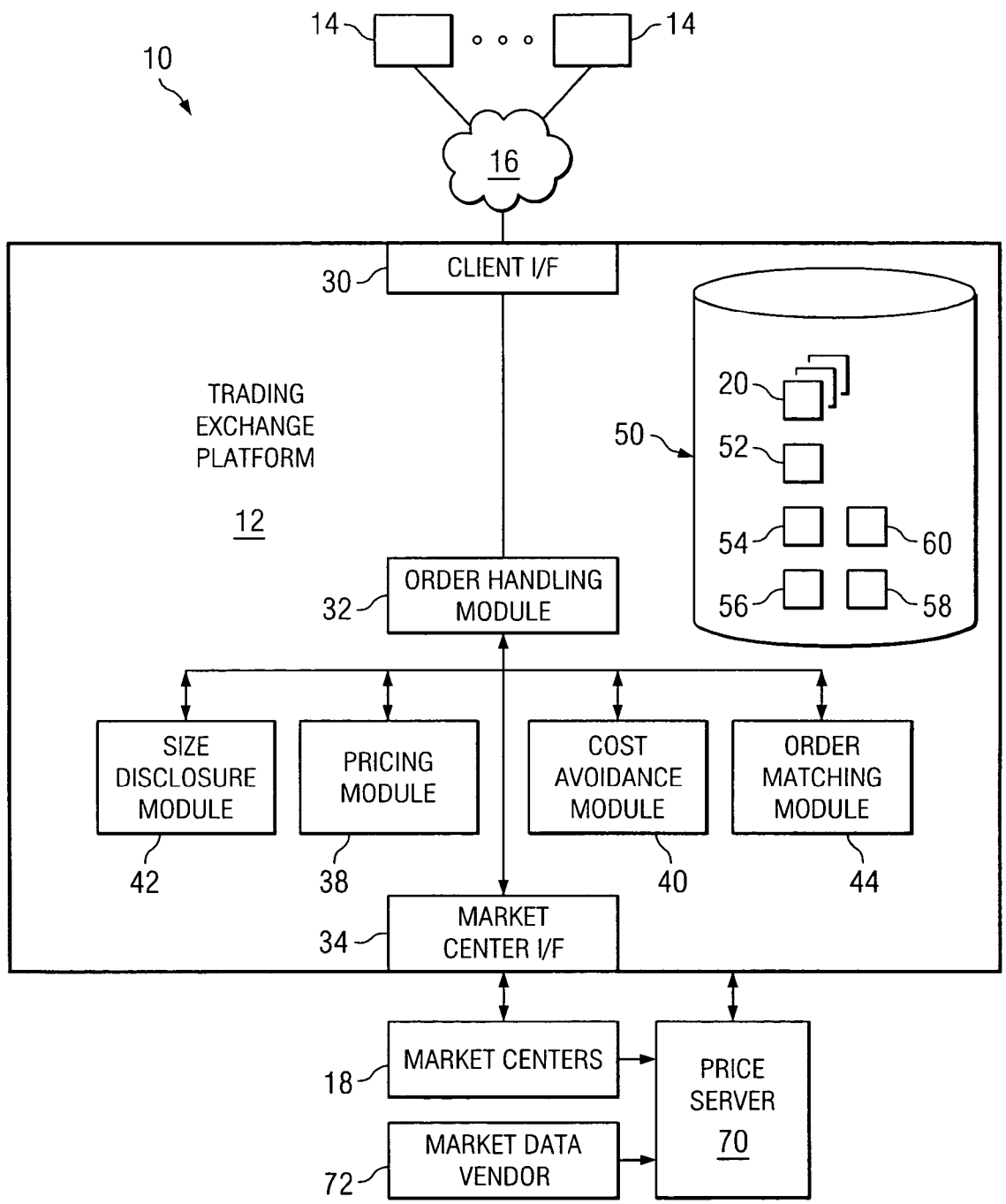
FIG. 1 illustrates one embodiment of a trading system in accordance with the present invention.

FIG. 1 illustrates one embodiment of a trading system 10 that includes a trading exchange platform 12 coupled to a variety of clients 14 using network 16 and further coupled to market centers 18. In general, system 10 optimizes the processing of trading orders 20 by internally matching trading orders 20 within trading exchange platform 12, filling trading orders 20 using market centers 18, avoiding transaction costs associated with market centers 18, routing trading orders 20 to particular market centers 18 based upon the best achievable price, and controlling the disclosure of certain details of a trading order 20 to market centers 18.

A trading order 20 comprises an order to buy a particular quantity of a particular trading product (e.g., bid request) or an order to sell a particular quantity of a particular trading product (e.g., offer request). The quantity of the trading product to be bought or sold is referred to herein as the "total quantity." Trading order 20 may further specify a "maximum disclosure quantity" which identifies all or a portion of the total quantity that may be disclosed to a market center 18 at any given time. In particular embodiments, a trading order 20 may also specify a target price (e.g., target bid price and target offer price) for the trading product. Although the following description of system 10 is detailed with respect to trading equities, the trading product that forms the basis of a given trading order 20 may comprise any type of goods, services, financial instruments, commodities, etc. Examples of financial instruments include, but are not limited to, stocks, bonds, and futures contracts.

Clients 14 comprise any suitable local or remote end-user devices that may be used by traders to access one or more elements of trading system 10, such as trading exchange platform 12. For example, a client 14 may comprise a computer, workstation, telephone, an Internet browser, an electronic notebook, a Personal Digital Assistant (PDA), a pager, or any other suitable device (wireless or otherwise), component, or element capable of receiving, processing, storing, and/or communicating information with other components of system 10. A client 14 may also comprise any suitable interface for a trader such as a display, a microphone, a keyboard, or any other appropriate terminal equipment according to particular configurations and arrangements. It will be understood that there may be any number of clients 14 coupled to network 16. Although clients 14 are described herein as being used by "traders," it should be understood that the term "trader" is meant to broadly apply to any user of trading system 10, whether that user is an agent acting on behalf of a principal, a principal, an individual, a legal entity (such as a corporation), or any machine or mechanism that is capable of placing and/or responding to trading orders 20 in system 10.

Network 16 is a communication platform operable to exchange data or information between clients 14 and trading exchange platform 12. Network 16 represents an Internet architecture in a particular embodiment of the present invention, which provides traders operating clients 14 with the ability to electronically execute trades or initiate transactions to be delivered to exchange platform 12. Network 16 could also be a plain old telephone system (POTS), which traders could use to perform the same operations or functions. Such transactions may be assisted by a broker associated with exchange platform 12 or manually keyed into a telephone or other suitable electronic equipment in order to request that a transaction be executed. In other embodiments, network 16 could be any packet data network (PDN) offering a communications interface or exchange between any two nodes in system 10. Network 16 may further comprise any combination of local area network (LAN), metropolitan area network (MAN), wide area network (WAN), wireless local area network (WLAN), virtual private network (VPN), intranet, or any other appropriate architecture or system that facilitates communications between clients 14 and exchange platform 12.

Market centers 18 comprise all manner of order execution venues including exchanges, Electronic Communication Networks (ECNs), Alternative Trading Systems (ATSs), market makers, or any other suitable market participants. Each market center 18 maintains a bid and offer price in a given trading product by standing ready, willing, and able to buy or sell at publicly quoted prices, also referred to as market center prices.

Trading exchange platform 12 is a trading architecture that facilitates the routing, matching, and otherwise processing of trading orders 20. Exchange platform 12 may comprise a management center or a headquartering office for any person, business, or entity that seeks to manage the trading of orders 20. Accordingly, exchange platform 12 may include any suitable combination of hardware, software, personnel, devices, components, elements, or objects that may be utilized or implemented to achieve the operations and functions of an administrative body or a supervising entity that manages or administers a trading environment. In the particular embodiment described herein, trading exchange platform 12 includes a number of interfaces, modules and databases that are executed to support the order processing activities of system 10.

Client interface 30 coupled to network 16 supports communication between clients 14 and the various components of exchange platform 12. In a particular embodiment, client interface 30 comprises a transaction server that receives trading orders 20 communicated by clients 14.

Order handling module 32 is coupled to client interface 30 and performs a number of order handling tasks within exchange platform 12. In particular, order handling module 32 records trading orders 20 in database 50 and routes trading orders 20 to various other modules or interfaces within exchange platform 12 for further processing. Market center interface 34 supports communication between exchange platform 12 and market centers 18.

Different market centers 18 provide different market center prices for particular trading products. For example, a particular market center 18 may offer a particular bid price and/or offer price for a particular trading product, while another market center 18 may offer a different bid price and/or offer price for the same trading product. Pricing module 38 selects a particular market center 18 to which to route a particular trading order 20 based upon the best market center price that may be obtained for the particular trading order 20, as described in greater detail with reference to FIGS. 2-4. In particular embodiments, pricing module 38 adjusts the market center prices of trading products according to cost information, rebate information, and/or best price information associated with market centers 18, prior to selecting a particular market center 18, as described in greater detail below.

Particular market centers 18 charge a transaction cost in order to execute a trading order 20 that remains in their order book for more than a certain length of time. Cost avoidance module 40 manages trading orders 20 that are pending with these types of market centers 18 in order to avoid these transaction costs, as described in greater detail with reference to FIGS. 5-7.

Different market centers 18 have adopted different policies regarding the disclosure to market makers of various details of a trading order 20, such as, for example, the size of a trading order 20. Size disclosure module 42 manages the disclosure of various details of a trading order 20 to market centers 18 based upon the disclosure policies adopted by those market centers 18, as described in greater detail with reference to FIGS. 8-10.

Order matching module 44 internalizes the matching of trading orders 20 within trading exchange platform 12, as described in greater detail with reference to FIGS. 11-13. In this regard, order matching module 44 may match an incoming trading order 20 specifying a bid request for a trading product with one or more stored offer requests for the trading product. Similarly, order matching module 44 may match an incoming trading order 20 specifying an offer request for a trading product with one or more stored bid requests for the trading product.

Each module described above with reference to trading exchange platform 12 comprises any suitable combination of hardware and software to provide the described function or operation of the module. For example, modules may include program instructions and associated memory and processing components to execute the program instructions. Also, modules illustrated in FIG. 1, and the operation associated therewith, may be separate from or integral to other modules. Furthermore, each of modules 38, 40, 42, and 44 may operate in conjunction with each other or on a stand-alone basis according to particular needs and desires.

Database 50 comprises one or more files, lists, tables, or other arrangements of information stored in one or more components of random access memory (RAM), read only memory (ROM), magnetic computer disk, CD-ROM, or other magnetic or optical storage media, or any other volatile or non-volatile memory devices. Although FIG. 1 illustrates database 50 as internal to trading exchange platform 12, it should be understood that database 50 may be internal or external to components of system 10, depending on particular implementations. Also, database 50 illustrated in FIG. 1 may be separate or integral to other databases to achieve any suitable arrangement of databases for use in system 10. Database 50 stores trading orders 20 and associated order identifiers 52 (e.g., internal order identifiers and external order identifiers), time thresholds 54, and order status information 56, as well as information 58 associated with market centers 18 (e.g., best price policy information, cost information, rebate information, disclosure policy information), and an order matching log 60.

It should be noted that the internal structure of trading exchange platform 12, and the interfaces, modules, and databases associated therewith, is malleable and can be readily changed, modified, rearranged, or reconfigured in order to achieve its intended operations.

Price server 70 provides pricing information to trading exchange platform 12. The pricing information may include market center prices, best bid prices (e.g., highest price a market center 18 is willing to pay for buying a trading product), and best offer prices (e.g., lowest price a market center 18 is willing to receive for selling a trading product). The best bid prices and the best offer prices are collectively referred to as best price information. In particular embodiments, price server 70 receives pricing information from market centers 18. In other embodiments, price server 70 receives pricing information from one or more market data vendors 72.

Pricing Module

FIG. 2 illustrates one embodiment of pricing module 38 coupled to database 50 and price server 70. Pricing module 38 is illustrated separate from other elements of trading exchange platform 12 and system 10 for illustrative purposes only, and it should be understood that pricing module 38 may interoperate with one or more other components of system 10 to perform the operations described herein. Where appropriate, FIG. 3 will be referred to in order to clarify various operations performed by pricing module 38.

Pricing module 38 receives a trading order 20 that comprises an order to buy a particular quantity of a particular trading product (e.g., bid request) or an order to sell a particular quantity of a particular trading product (e.g., offer request). However, the trading order 20 is unspecified as to which market center 18 it is to be routed. Pricing module 38 identifies particular market centers 18 to which the trading order 20 may potentially be routed. Referring to FIG. 3 that illustrates a table 100, for example, pricing module 38 may identify five market centers 18 that could potentially match the trading order 20 received by pricing module 38. As illustrated in table 100, the eligible market centers 18 could include: ARCA, ISLD, NITE, MWSE, and BRUT.

Referring back to FIG. 2, pricing module 38 receives from price server 70 market center prices 102 for the trading product underlying the trading order 20. As illustrated in table 100, the market center prices 102 may be formatted as: bid price X offer price. The market center prices 102 may be valid for some or all of the specified quantity of the trading product underlying the trading order 20. Moreover, each market center 18 may have a different market center price 102 for the particular trading product.

Pricing module 38 also receives from price server 70 a best price 104 for the trading product. Best price 104 represents the best bid price 104 and best offer price 104 that is available for the trading product among all market centers 18. For example, the best bid price 104 comprises the highest price that any market center 18 is willing to pay when buying the trading product. The best offer price 104 comprises a lowest price that any market center 18 is willing to receive when selling the trading product. For the example described herein, the best price 104 for the trading product is 9.500×10.000 at BRUT×BRUT.

Pricing module 38 performs one or more adjustments to market center prices 102 according to market center information 58 and best price 104. The market center information 58 may include a best price policy 106, cost information 108, and rebate information 110. The best price policy 106 of each market center 18 indicates what that market center 18 will do in response to the best price 104. For example, the market center 18 may match the best price 104, split the best price 104, or disregard the best price 104. The cost information 108 specifies a transaction cost charged by a particular market center 18 for processing the trading order 20. The rebate information 110 specifies a transaction rebate credited by a particular market center 18 for processing the trading order 20. Therefore, pricing module 38 adjusts market center prices 102 according to these factors to determine an adjusted market center price 112 for each market center 18.

Referring to table 100, for example, pricing module 38 receives a market center price 102 of 9.250×10.010 for ARCA and determines that ARCA disregards best price 104, charges $0.003 as a transaction cost, and does not rebate anything for processing the trading order 20. Pricing module therefore determines that the adjusted market center price 112 for ARCA is 9.247×10.013.

With respect to ISLD, pricing module 38 receives a market center price 102 of 9.260×10.020 and determines that ISLD disregards best price 104, does not charge a transaction cost, and rebates $0.003 for processing the trading order 20. Pricing module therefore determines that the adjusted market center price 112 for ISLD is 9.263×10.017.

With respect to NITE, pricing module 38 receives a market center price 102 of 9.000×10.050 and determines that NITE matches best price 104, which is 9.500×10.000. By matching best price 104, pricing module 38 sets the bid price 102 of NITE to the best bid price 104 of 9.500, and sets the offer price 102 of NITE to the best offer price 104 of 10.000. Pricing module 38 determines that NITE neither charges a transaction cost nor credits a transaction rebate for processing trading order 20. As a result, pricing module 38 determines that the adjusted market center price 112 for NITE is 9.500× 10.000.

With respect to MWSE, pricing module 38 receives a market center price 102 of 9.000×10.060 and determines that MWSE splits best price 104, which is 9.500×10.000. By splitting best price 104, pricing module 38 sets the bid price 102 and offer price 102 of MWSE to the average of the best bid price 104 and best offer price 104, which is 9.750. Pricing module 38 determines that MWSE charges $0.001 as a transaction cost but does not rebate anything for processing the trading order 20. As a result, pricing module 38 determines that the adjusted market center price 112 for MWSE is 9.749× 9.751.

With respect to BRUT, pricing module 38 receives a market center price 102 of 9.500×10.000, determines that BRUT disregards best price 104, charges $0.004 as a transaction cost, and does not rebate anything for processing the trading order 20. Pricing module therefore determines that the adjusted market center price 112 for BRUT is 9.496×10.004.

Based upon the adjusted market center prices 112 and the side of the trading order 20 that pricing module 38 is processing (e.g., bid or offer), pricing module 38 compares market center prices 112 and identifies the market centers 18 where the best market center price 112 is available. For example, if the trading order 20 specified a bid request for a trading product, the pricing module 38 identifies the market centers 18 offering the lowest offer price 112 for the trading product. In this regard, pricing module 38 selects MWSE associated with an offer price 112 of 9.751, and routes trading order 20 to MWSE. If the trading order 20 specified an offer request for the trading product, the pricing module 38 identifies the market centers 18 offering the highest bid price 112 for the trading product. In this regard, pricing module 38 selects MWSE associated with a bid price 112 of 9.749, and routes trading order 20 to MWSE.

Although market center prices 102 are described above as being adjusted in response to best price 104 and best price policy 106, cost information 108, and rebate information 110, it should be understood that pricing module 38 may adjust market center prices 102 according to some or all of those factors to determine market center prices 112. For example, pricing module 38 may adjust market center prices 102 according to best price 104 and best price policy 106 but not according to cost information 108 or rebate information 110. Moreover, pricing module 38 may adjust market center prices 102 according to cost information 108 and/or rebate information 110 but not according to best price 104 and best price policy 106.

Figure 4:
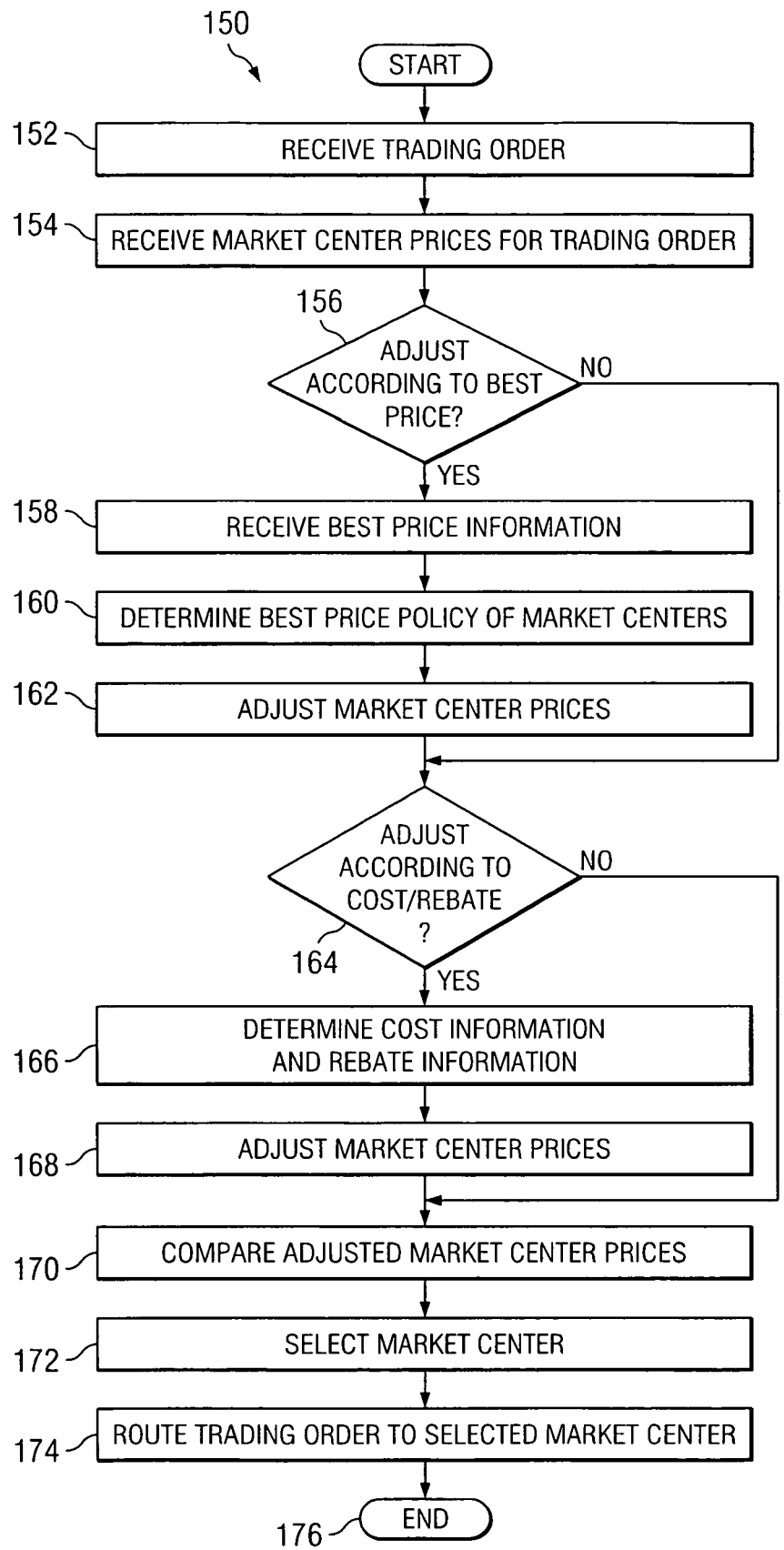
FIG. 4 illustrates a flowchart of an exemplary method for routing trading orders according to price.

FIG. 4 illustrates a flowchart 150 of an exemplary method for routing trading orders 20 to market centers 18 according to price. The method begins at step 152 where pricing module 38 receives a trading order 20. Pricing module 38 receives market center prices 102 for the trading product underlying the trading order 20, at step 154. Pricing module 38 determines whether an adjustment to market center prices 102 is to be made according to best price at step 156. If so, execution proceeds to step 158 where pricing module 38 receives best prices 104. Best prices 104 may include best bid price 104 and/or best offer price 104.

Pricing module 38 determines the best price policy 106 of market centers 18 at step 160. In particular embodiments, best price policy 106 is stored as a part of market center information 58 in database 50. Pricing module 38 adjusts market center prices 102 accordingly at step 162. In particular, if a particular market center 18 disregards best prices 104, then pricing module 38 does not adjust the market center price 102 for that market center 18. If a particular market center 18 matches the best prices 104, then pricing module 38 sets the bid price 102 of that market center 18 to the best bid price 104, and sets the offer price 102 of that market center 102 to the best offer price 104. If a particular market center 18 splits the best prices 104, then pricing module 38 sets the bid price 102 and offer price 102 of that market center 18 to the average of the best bid price 104 and best offer price 104.

Upon adjusting market center prices 102 at step 162, or if it is determined that market center prices 102 are not to be adjusted according to best price 104 at step 156, execution proceeds to step 164 where pricing module 38 determines whether to adjust market center prices 102 according to cost information 108 and/or rebate information 110. If so, execution proceeds to step 166 where pricing module 38 determines cost information 108 and/or rebate information 110 for market centers 18. In particular embodiments, information 108 and 110 is stored as a part of market center information 58 in database 50.

Pricing module 38 adjusts market center prices 102 at step 168. In particular, if a particular market center 18 charges a transaction cost for processing a trading order 20, then pricing module 38 subtracts the transaction cost from the bid price 102 of the particular market center 18, and adds the transaction cost to the offer price 102 of the particular market center 18. If a particular market center 18 credits a transaction rebate for processing a trading order 20, then pricing module adds the transaction rebate to the bid price 102 of the particular market center 18, and subtracts the transaction rebate from the offer price 102 of the particular market center 18. If pricing module 38 previously adjusted market center prices 102 at step 162, then at step 168 pricing module 38 adjusts the previously adjusted market prices further.

Upon adjusting market center prices 102 at step 168, or if it is determined that market center prices 102 are not to be adjusted according to cost information 108 and/or rebate information 110 at step 164, execution proceeds to step 170 where pricing module 38 compares adjusted market center prices 112. In particular, pricing module 38 identifies the lowest offer price 112 for the trading product if the trading order 20 specifies a bid request. Pricing module 38 identifies the highest bid price 112 for the trading product if the trading order 20 specifies an offer request. If market center prices 102 have not been adjusted at either of steps 162 or 168, then pricing module 38 compares market center prices 102 at step 170.

Execution proceeds to step 172 where pricing module 38 selects a market center 18 based upon the comparison performed at step 170. In particular, pricing module 38 identifies each of the market centers 18 that offer the lowest offer price 112 and/or the highest bid price 112. If more than one market center 18 qualifies, then pricing module 38 may select a particular one market center 18 according to a pre-established priority ranking of market centers 18, or according to other decision factors.

In certain instances, more than one market center 18 may offer the lowest offer price 112 or the highest bid price 112. In those instances, module 38 may identify those market centers 18 that offer the lowest offer price 112 or highest offer price 112 for a quantity of the trading product that is at least as much as a quantity specified by trading order 20. Module 38 then selects one of the identified market centers 18.

Trading exchange platform 12 routes the trading order 20 to the selected market center 18 at step 174. In particular embodiments, other modules of trading exchange platform 12 will perform processing of the trading order 20 either before or after the operation of pricing module 38. Therefore, it should be understood that other modules associated with exchange platform 12, or even market center interface 34, may route the trading order 20 to the selected market center 18 on behalf of pricing module 38. The method terminates at step 176.

It should be understood that the steps described in the flowchart of FIG. 4, as well as in other flowcharts illustrated herein, may be performed simultaneously and/or in different orders than as shown without departing from the scope of this disclosure.

Cost Avoidance Module

FIG. 5 illustrates one embodiment of cost avoidance module 40 coupled to database 50 and price server 70. Cost avoidance module 40 is illustrated separate from other elements of trading exchange platform 12 and system 10 for illustrative purposes only, and it should be understood that cost avoidance module 40 may interoperate with one or more other components of system 10 to perform the operations described herein.

Cost avoidance module 40 receives information regarding a trading order 20 that is being routed to a selected market center 18. In some instances, the selected market center 18 may charge a transaction cost in order to execute the trading order 20 if it remains on the order book of the selected market center 18 for more than a certain length of time. For example, the NYSE and AMEX do not charge any floor brokerage fees for orders that they are able to execute in under five minutes. However, each charges a fee in order to execute orders that have been in their books for more than five minutes. Information about the identity of the selected market center 18 and the details of the trading order 20 may be received by cost avoidance module 40 from pricing module 38. Information about the amount and timing of the transaction costs charged by the selected market center 18 may be received by cost avoidance module 40 from either or both of pricing module 38 and price server 70.

To avoid these transaction costs, cost avoidance module 40 performs a "cancel and replace" operation. In particular, cost avoidance module 40 monitors the length of time a trading order 20 is active with a market center 18 that charges a transaction cost as described above. Cost avoidance module 40 may begin such monitoring in response to receiving an acknowledgment 200 that the trading order 20 is active with the market center 18. Acknowledgment 200 may be received by cost avoidance module 40 from any suitable component of platform 12 or directly from a particular market center 18.

Cost avoidance module 40 determines a timeout when the length of time the trading order 20 is active with the market center 18 equals or exceeds an associated time threshold 54. Time threshold 54 specifies a length of time that is a predetermined amount of time, also referred to as buffer time, less than the length of time a particular market center 18 will process a trading order 20 before charging a transaction cost. For example, if a market center 18 charges a transaction cost for maintaining a trading order 20 active in its order book beyond five minutes, then cost avoidance module 40 may determine a timeout when the trading order 20 has been active for four minutes and fifty seconds. In this regard, the time threshold 54 is associated with the market center 18 that is processing the trading order 20.

Any suitable time threshold 54 may be selected in order to provide enough buffer time to cancel and replace a trading order 20 as further described herein. Therefore, although the time threshold 54 is described above as four minutes and fifty seconds in order to maintain a ten second buffer before transaction costs are charged at the five minute mark, an earlier or later time threshold 54 may be selected according to particular needs or desires. For example, in accordance with particular embodiments, the time threshold 54 may be set to thirty seconds (or some other suitable period of time) to automatically perform a cancel/replace operation.

In response to determining a timeout, cost avoidance module 40 communicates a cancel instruction 202 that effectively removes the trading order 20 from active status on the order book of the appropriate market center 18. Cost avoidance module 40 also communicates an order instruction 204 that essentially comprises a new trading order 20 having the same parameters of the trading order 20 that was just canceled. In this regard, the old trading order 20 is canceled and replaced by a new trading order 20. Cost avoidance module 40 maintains order identifiers 52 (e.g., internal order identifier and external order identifier) in order to manage the cancel and replace operations described above.

Cancel instruction 202 and order instruction 204 may each be communicated to one or more components of trading exchange platform 12, such as market center interface 34, for eventual communication to the appropriate market center 18. Alternatively, either or both of instructions 202 and 204 may be communicated directly from cost avoidance module 40 to the appropriate market center 18. In a particular embodiment, instructions 202 and 204 may be communicated substantially simultaneously, or even in the same message.

Although the cancel and replace operation described above causes the initial trading order 20 to lose its position in the order book of the market center 18, it reduces transaction costs charged by the market center 18.

Figure 6A:
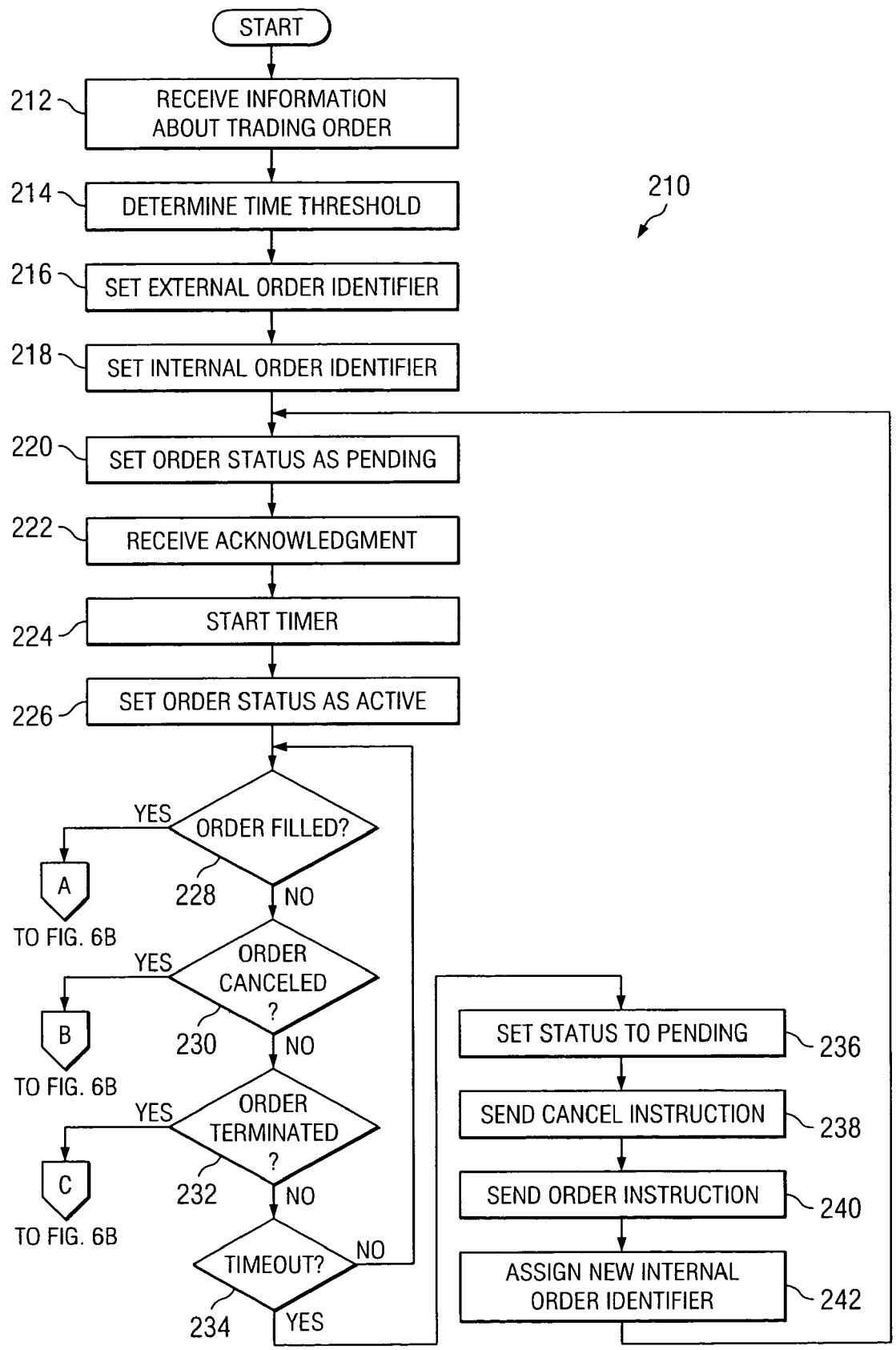
FIGS. 6A-6B illustrate a flowchart of an exemplary method for avoiding transaction costs.
Figures 6B, 7:
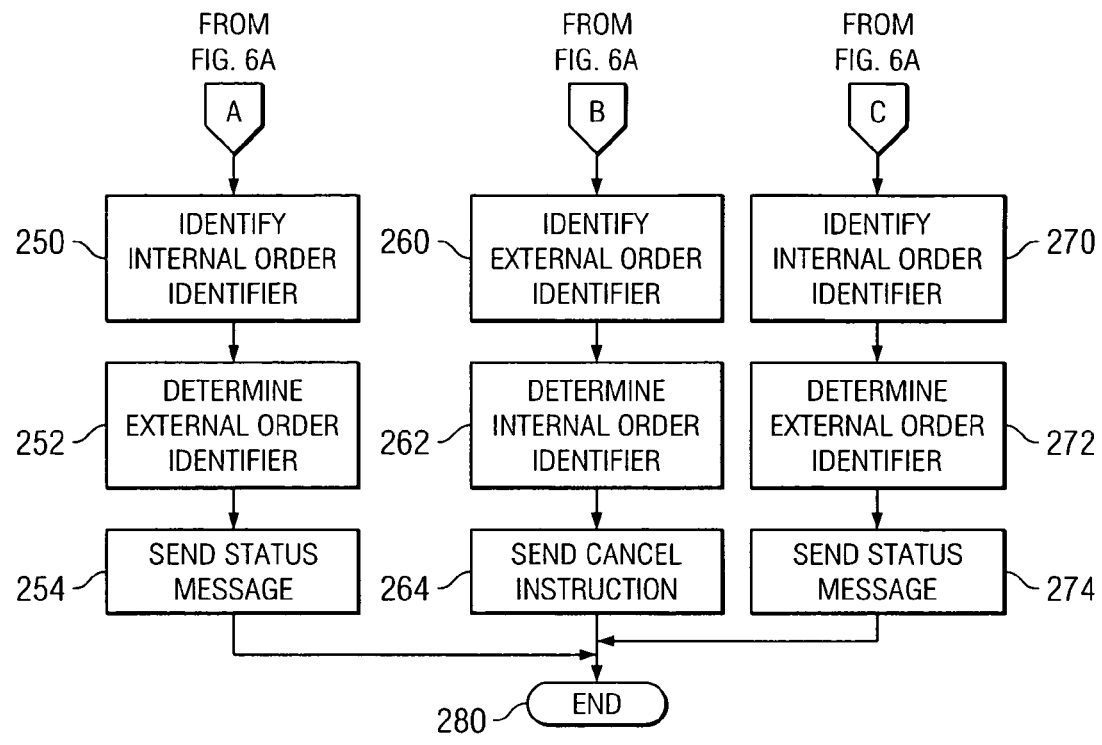
FIG. 7 illustrates a table of information used by the cost avoidance module.

FIGS. 6A-6B illustrate a flowchart 210 of an exemplary method for avoiding transaction costs during the processing of trading orders 20 by market centers 18. Where appropriate, FIG. 7 will be referred to in order to clarify various operations performed by cost avoidance module 40. The method begins at step 212 where cost avoidance module 40 receives information about a particular trading order 20. The information may include the parameters of the trading order 20, the identity of the particular market center 18 to which the trading order 20 is being routed, and an indication that this market center 18 charges a transaction cost in order to execute the trading order 20 if it remains on the order book for more than a certain length of time.

Cost avoidance module 40 determines a time threshold 54 at step 214. Execution proceeds to steps 216 and 218 where cost avoidance module 40 sets an external order identifier 52a and an internal order identifier 52b for the trading order 20, respectively. Cost avoidance module 40 sets order status 56 to pending at step 220. Referring to table 206 of FIG. 7, for example, cost avoidance module 40 sets external order identifier 52a and internal order identifier 52b to "1", as indicated in row 208a. Cost avoidance module 40 further determines the time threshold 54 to be "4:50", and sets the order status to "P" for pending.

Referring back to flowchart 210, cost avoidance module 40 receives an acknowledgment 200 at step 222. Acknowledgment 200 indicates that the trading order 20 is active with the market center 18. Module 40 starts a timer at step 224 to begin monitoring the length of time the trading order 20 is active with the market center 18. Module 40 sets the order status 56 for the trading order 20 to active at step 226, as indicated in row 208b of table 206.

Cost avoidance module 40 determines whether the order 20 has been filled by the market center 18 at step 228. In one embodiment, cost avoidance module 40 receives a message indicating that the order 20 has been filled. This message identifies the order 20 using the internal order identifier 52b.

If the order has not been filled, as determined at step 228, execution proceeds to step 230 where cost avoidance module 40 determines whether the order 20 has been canceled. In one embodiment, cost avoidance module 40 receives a message, such as a cancel request generated by a trader, requesting that the order 20 be canceled. This message identifies the order 20 using the external order identifier 52a.

If the order has not been canceled, as determined at step 230, execution proceeds to step 232 where cost avoidance module 40 determines whether the order 20 has been terminated. In one embodiment, cost avoidance module 40 receives a message, such as a "UR OUT" message, indicating that the order 20 has been terminated. This message identifies the order 20 using the internal order identifier 52b.

If the order has not been terminated, as determined at step 232, execution proceeds to step 234 where cost avoidance module 40 determines whether a timeout has occurred. In particular, module 40 determines a timeout when the length of time the trading order 20 is active with the market center 18, as measured for example by the timer that is started at step 224, equals or exceeds the time threshold 54 determined at step 214. If a timeout has not occurred as determined at step 234, execution returns to step 228. If a timeout has occurred as determined at step 234, execution proceeds to step 236.

At step 236, cost avoidance module 40 sets order status 56 to pending, as indicated in row 208c of table 206. Module 40 sends cancel instruction 202 at step 238 and sends order instruction 204 at step 240. Although flowchart 210 illustrates instructions 202 and 204 being sent sequentially in time, it should be understood that they may be sent at substantially the same time and/or in a single message or communication. Cancel instruction 202 effectively removes the trading order 20 from active status on the order book of the market center 18. Order instruction 204 essentially comprises a new trading order 20 having the same parameters of the trading order 20 that was just canceled. In this regard, the cost avoidance module 40 performs a "cancel and replace" operation.

Cost avoidance module 40 assigns a new internal order identifier 52b to be associated with the new trading order 20. Referring to row 208d of table 206, the new internal order identifier 52b is "2" and it is cross-referenced with the original external order identifier 52a of "1". Execution returns to step 220 where module 40 sets the order status 56 to pending.

Upon receiving an acknowledgment 200 associated with the new trading order 20 at step 222, module 40 starts a timer at step 224 and sets the order status 56 to active at step 226. In this regard, module 40 begins monitoring the length of time that the new trading order 20 is active in the order book of the market center 18. Row 208e of table 206 indicates that the new trading order 20 has an order status 56 of active.

Execution again proceeds through steps 228, 230, and 232 in order to determine whether an order has been filled, canceled, or terminated. If it is determined at step 228 that the trading order 20 has been filled, such as, for example, in response to a message from market center 18 indicating that the order 20 is filled, then execution proceeds to step 250. At step 250, module 40 identifies the internal order identifier 52b associated with the filled order 20. As described above, identifier 52b may be specified by the message from market center 18 indicating that the order 20 is filled. At step 252, module 40 determines the external order identifier 52a that is associated with the internal order identifier 52b identified at step 250. For example, module 40 may refer to row 208e of table 206 in order to determine the appropriate cross-reference between external order identifier 52a and internal order identifier 52b. Module 40 sends a status message for communication to the trader indicating that the order 20 is filled, at step 254. The status message uses the external order identifier 52a in order to identify the trading order 20 to the trader. Execution terminates at step 280.

If it is determined at step 230 that the trading order 20 has been canceled, such as, for example, in response to a message from a trader requesting that the order 20 be canceled, then execution proceeds to step 260. At step 260, module 40 identifies the external order identifier 52a associated with the canceled order 20. As described above, identifier 52a may be specified by the message from the trader requesting that the order 20 be canceled. At step 262, module 40 determines the internal order identifier 52b that is associated with the external order identifier 52a identified at step 260. For example, module 40 may refer to row 208e of table 206 in order to determine the appropriate cross-reference between external order identifier 52a and internal order identifier 52b. Module 40 sends a cancel instruction 202 for communication to the market center 18, at step 264. Cancel instruction 202 effectively removes the trading order 20 from active status on the order book of the market center 18. The cancel instruction 202 uses the internal order identifier 52b in order to identify the trading order 20 to the market center 18. Execution terminates at step 280.

If it is determined at step 232 that the trading order 20 has been terminated, such as, for example, in response to a message from market center 18 indicating that some or all of the order 20 is terminated, then execution proceeds to step 270. At step 270, module 40 identifies the internal order identifier 52b associated with the terminated order 20. As described above, identifier 52b may be specified by the message from market center 18 indicating that the order 20 is terminated. At step 272, module 40 determines the external order identifier 52a that is associated with the internal order identifier 52b identified at step 270. For example, module 40 may refer to row 208e of table 206 in order to determine the appropriate cross-reference between external order identifier 52a and internal order identifier 52b. Module 40 sends a status message for communication to the trader indicating that some or all of the order 20 is terminated, at step 274. The status message uses the external order identifier 52a in order to identify the trading order 20 to the trader. Execution terminates at step 280.

Size Disclosure Module

FIG. 8 illustrates one embodiment of size disclosure module 42 coupled to database 50. Size disclosure module 42 is illustrated separate from other elements of trading exchange platform 12 and system 10 for illustrative purposes only, and it should be understood that size disclosure module 42 may interoperate with one or more other components of system 10 to perform the operations described herein. Where appropriate, table 300 of FIG. 9 will be referred to in order to clarify various operations performed by size disclosure module 42.

Traders that submit large trading orders 20 may not wish for all market participants to view the total size of their orders 20 but are unlikely to want to enter a series of smaller orders 20. Size disclosure module 42 addresses this problem by allowing a trader to specify in a trading order 20 a total quantity of a trading product to buy or sell as well as a maximum disclosure quantity of the trading product to display to the market participants at any one time. Size disclosure module 42 determines the size of the trading order 20 to disclose to particular market centers 18 based at least in part upon the disclosure policies of those market centers 18, as described more fully herein.

Referring to FIG. 9 that illustrates a table 300, for example, size disclosure module 42 may identify the disclosure policies 302 of different market centers 18. As illustrated in table 300, the market centers 18 could include at least three different disclosure policies 302: PROP, IOC, and NOIOC.

PROP

A market center that has a disclosure policy 302 of "PROP" has a proprietary reserve capability whereby the market center 18 allows trading exchange platform 12 to send reserve trading orders 20. Reserve trading orders 20 are orders that specify the total quantity of the trading product to be traded (e.g., total number of shares of a stock to be bought or sold), and the maximum disclosure quantity of the trading product to be disclosed to the public at any one time (e.g., maximum number of shares of a stock to publicly disclose as being bought or sold). These market centers 18 will fill up to the total quantity but will not disclose more than the maximum disclosure quantity specified in the reserve trading order 20.

Many market centers 18 do not support a proprietary reserve capability. Moreover, the best price 104 available for the trading order 20 may be at a market center 18 that does not provide a proprietary reserve capability. Therefore, size disclosure module 42 is able to control the size disclosure of a trading order 20 even when the market center 18 does not offer a proprietary reserve capability.

IOC

A market center 18 that has a disclosure policy 302 of "IOC" does not disclose IOC orders 20 to market participants. An IOC order 20 comprises an order that the market center 18 attempts to fill immediately, on a best efforts basis, and cancels what portion they are not able to fill immediately. In this regard, "IOC" stands for Immediate Or Cancel. With regard to these market centers 18, size disclosure module 42 initially communicates an IOC trading order 20 specifying a total quantity of the trading product. The market center 18 may or may not fill the entire IOC trading order 20, but will respond accordingly.

For example, if the trading order 20 received by module 42 specifies a total quantity of 50,000 shares of stock X and a maximum disclosure quantity of 10,000 shares of stock X, then the IOC trading order 20 communicated by module 42 may comprise: "BUY 50,000 shares of stock X," and the response from the market center may be, for example: "BOUGHT 2,000 shares of stock X; UR OUT 48,000 shares of stock X." The "UR OUT" portion of the response is shorthand notation indicating that the market center 18 has released the trader from the legal liability associated with having placed an order 20 in their order book.

If the response from the market center 18 contains a "UR OUT" message, as above, size disclosure module 42 communicates a DAY order 20 for the lesser of the maximum disclosure quantity (e.g., 10,000 shares of stock X) and the remaining quantity for the order 20 (e.g., 48,000 shares of stock X). A DAY order 20 comprises an order that remains on the order book of the market center 18 for the remainder of the current trading day, or until it is canceled or filled. Therefore, the DAY order 20 may comprise: "BUY 10,000 shares of stock X."

When the DAY order 20 is completely filled, size disclosure module 42 communicates another IOC order 20 for the remaining quantity of the trading order 20 (e.g., 38,000 shares of stock X). The process of alternating the communication of IOC orders 20 and DAY orders 20 to the market center 18 is repeated until either the trader cancels the order 20 or the order 20 is completely filled.

NOIOC

A market center 18 that has a disclosure policy 302 of "NOIOC" discloses IOC orders 20 to market participants. With regard to these market centers 18, size disclosure module 42 communicates a DAY order 20 for the maximum disclosure quantity. When the DAY order 20 is completely filled, module 42 sends another DAY order 20 for the lesser of the specified maximum disclosure quantity and the remaining quantity of the trading order 20. This process of sending DAY orders 20 is repeated until either the trader cancels the order 20 or the order 20 is completely filled.

Figure 10:
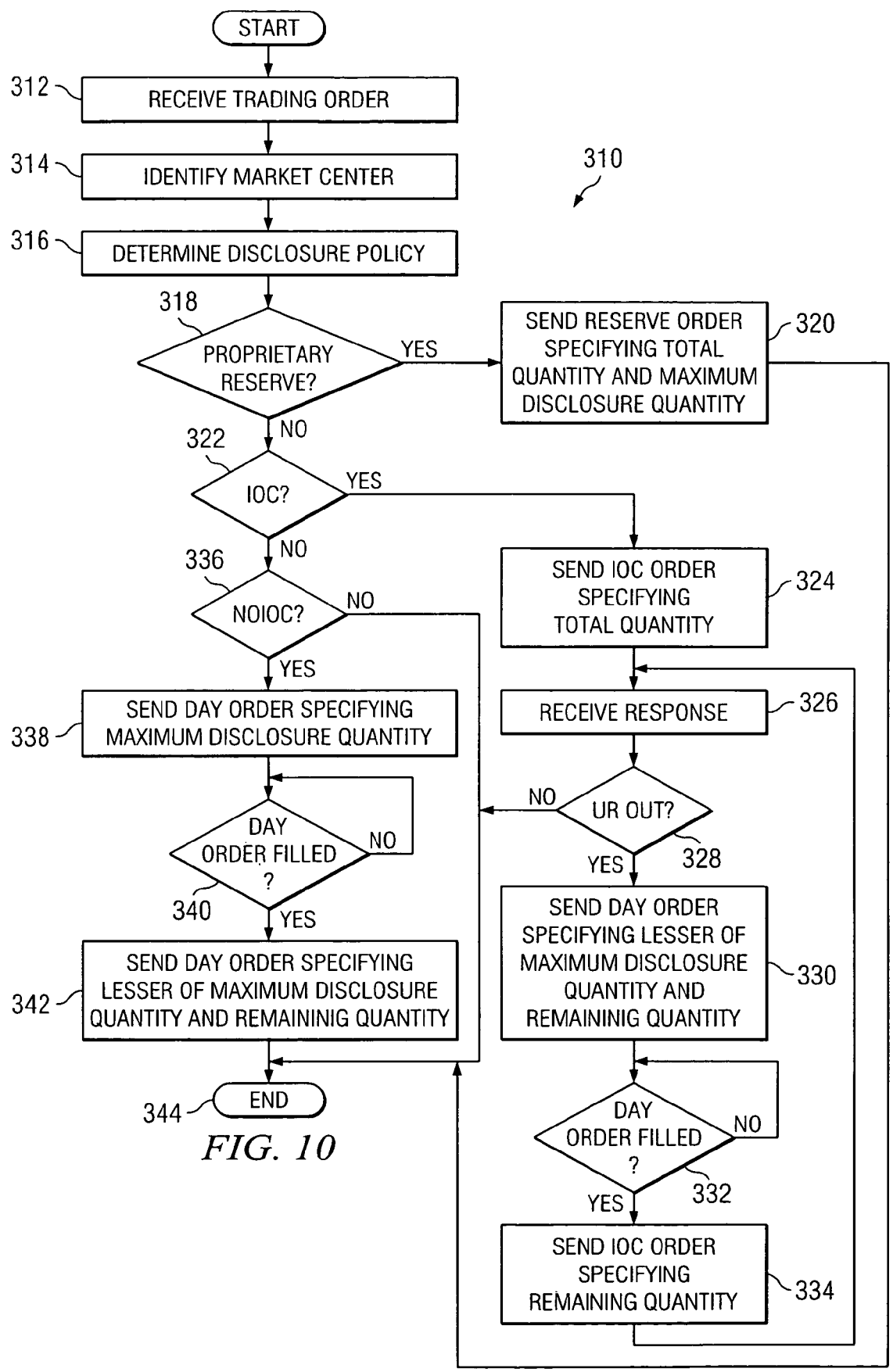
FIG. 10 illustrates a flowchart of an exemplary method for controlling the size disclosure of a trading order.

FIG. 10 illustrates a flowchart 310 of an exemplary method for controlling size disclosure of trading orders 20 to market centers 18. The method begins at step 312 where size disclosure module 42 receives trading order 20 that specifies a total quantity of a trading product and a maximum disclosure quantity of the trading product. Trading order 20 may be received from any suitable component of trading exchange platform 12 and specifies a particular market center 18 to which it is to be routed. Size disclosure module 42 identifies the particular market center 18 at step 314 and determines the disclosure policy 302 associated with the identified market center 18 at step 316 using, for example, table 300.

Depending upon the type of disclosure policy 302 adopted by the identified market center 18, size disclosure module 42 performs a number of operations. Module 42 determines whether the disclosure policy 302 is a proprietary reserve policy at step 318. If so, execution proceeds to step 320 where module 42 sends a reserve order 20 specifying the total quantity of the trading product to be bought (or sold) and the maximum disclosure quantity of the trading product. The reserve order 20 may be sent to the market center 18 identified at step 314 by module 42 or by any suitable component of trading exchange platform 12 on behalf of module 42. This is the case with all such communications, such as trading orders 20, sent by module 42. Execution terminates at step 344.

If it is determined at step 318 that the disclosure policy 302 of the identified market center 18 is not a proprietary reserve policy, execution proceeds to step 322 where module 42 determines whether the disclosure policy 302 of the identified market center 18 is an IOC policy. If so, execution proceeds to step 324 where module 42 sends an IOC order 20 specifying the total quantity of the trading product to be bought (or sold). Module 42 receives a response at step 326 and if it is determined at step 328 that the response does not contain a "UR OUT" message, then the entire IOC order 20 was filled by the market center 18 and execution terminates at step 344.

If the response received at step 326 does indeed contain a "UR OUT" message as determined at step 328, then execution proceeds to step 330 where module 42 sends a DAY order 20 specifying the lesser of the maximum disclosure quantity and the remainder of the total quantity of the trading order 20 received at step 312. The DAY order 20 remains pending at the market center 18 until it is determined at step 332 that it has been filled. Execution then proceeds to step 334 where module 42 sends another IOC order 20 specifying the remainder of the total quantity of the trading order 20 received at step 312. Execution then returns to step 326. Steps 326 through 334 are repeated until the entire trading order 20 is filled, as determined by not receiving a "UR OUT" message at step 328.

If it is determined at step 322 that the disclosure policy 302 of the identified market center 18 is not an IOC policy, execution proceeds to step 336 where module 42 determines whether the disclosure policy 302 of the identified market center 18 is an NOIOC policy. If so, execution proceeds to step 338 where module 42 sends a DAY order 20 specifying the maximum disclosure quantity of the trading product to be bought (or sold). The DAY order 20 remains pending at the market center 18 until it is determined at step 340 that it has been filled. Execution then proceeds to step 342 where module 42 sends another DAY order 20 specifying the lesser of the maximum disclosure quantity and the remainder of the total quantity of the trading order 20 received at step 312. Execution terminates at step 344.

Order Matching Module

FIG. 11 illustrates one embodiment of order matching module 44 coupled to database 50 and price server 70. Order matching module 44 is illustrated separate from other elements of trading exchange platform 12 and system 10 for illustrative purposes only, and it should be understood that order matching module 44 may interoperate with one or more other components of system 10 to perform the operations described herein. Where appropriate, FIG. 12 will be referred to in order to clarify various operations performed by order matching module 44.

Order matching module 44 receives a trading order 20 that comprises an order to buy a particular quantity of a particular trading product (e.g., bid request) at a target bid price, or an order to sell a particular quantity of a particular trading product (e.g., offer request) at a target offer price. However, the trading order 20 is unspecified as to which market center 18 it is to be routed. For example, order matching module may receive a trading order 20 from Trader 1 that comprises an order to sell 100,000 shares of XYZ stock at a target price of 9.98.

Order matching module 44 manages an order matching log 60 stored in database 50 in order to match the incoming trading order 20 with one or more stored requests for the trading product. Referring to FIG. 12 that illustrates log 60, for example, order matching module 44 may match an incoming trading order 20 specifying an offer request, such as the one identified above, with one or more stored bid requests for the trading product illustrated in columns 404. Similarly, order matching module 44 may match an incoming trading order 20 specifying a bid request for a trading product with one or more stored offer requests for the trading product illustrated in columns 406.

Entries in columns 404 comprise information associated with stored bid requests such as product 410, bid quantity 412, source 414, bid price 416, and status 418. Entries in columns 406 comprise information associated with stored offer requests such as product 420, offer quantity 422, source 424, offer price 426, and status 428. Product 410 and 420 refers to a particular trading product, such as XYZ stock, that may be the subject of a trade. Bid quantity 412 and offer quantity 422 refer to the amount of the trading product that is being sought to buy or being offered for sale, respectively. Source 414 and 424 refers to the party seeking to buy or sell the trading product, such as a particular market center 18 or a particular trader operating within system 10. Price 416 and 426 refers to bid price and offer price, respectively, that may be unadjusted prices 102 or adjusted prices 112. Status 418 and 428 refers to the status of a particular bid request or offer request, respectively.

Upon receiving trading order 20 from Trader 1 specifying an order to sell 100,000 shares of XYZ stock at a target price of 9.98, order matching module 44 refers to columns 404 associated with stored bid requests for XYZ stock in order to find a match. In general, order matching module 44 seeks to fill the trading order 20 in a manner that will result in the best price for the traders involved. In this regard, order matching module 44 seeks entries in columns 404 identifying the highest bid price 416 for XYZ stock.

Each of Trader 2 and Trader 3 have submitted a bid request for XYZ stock at a bid price 416 of 10.02 which is higher than Trader 1's target offer price of 9.98. In the event multiple traders have submitted a trading request at the same bid price (or offer price), such as the case with Trader 2 and Trader 3, order matching module 44 fills the bid requests (or offer requests) in a particular order depending on one or more of the bid quantity (or offer quantity) of each request, the order that each request was received, the identity of the trader, or any other suitable factor used to prioritize among traders. Order matching module 44 may fill the bid/offer request of a trader ahead of the bid/offer request of a market center 18 having the same bid price or offer price in order to promote liquidity and reduce transaction costs.

Because the trading order 20 submitted by Trader 1 requested to sell 100,000 shares, each of the bid requests submitted by Trader 2 and Trader 3 are matched, resulting in a first matched trading order between Trader 1 and Trader 2 for 1,000 shares of XYZ stock, and a second matched trading order between Trader 1 and Trader 3 for 2,000 shares of XYZ stock. The price for each of these matched trading orders, referred to as the matched price, is based at least in part upon the bid price 416 of the bid request and the offer price specified by the trading order 20. For example, the matched price may comprise 10.02 (bid price 416 of the bid request), 9.98 (offer price specified by the trading order 20), or any price therebetween such as, 10.00, the average of 9.98 and 10.02. The status of the bid requests associated with Trader 2 and Trader 3 is indicated with a flag, such as "Matched". Alternatively, a bid request that is matched may be removed from log 60 to indicate that it has been matched.

The trading order 20 now has a remaining offer quantity balance of 97,000 shares of XYZ stock (e.g., 100,000 shares–1,000 shares–2,000 shares=97,000 shares). Order matching module 44 determines that ARCA has quoted a bid price 416 of 10.01 for 6,000 shares of XYZ stock, which is higher than Trader 1's target offer price of 9.98. In one embodiment, order matching module 44 therefore routes a trading order 20 to ARCA comprising an order to sell 6,000 shares of XYZ stock at 10.01.

In other embodiments, order matching module 44 determines a quantity of the trading product to route in a trading order 20 to ARCA, also referred to as a market center quantity, based upon the bid quantity quoted by the market center 18 (e.g., 6,000 shares of XYZ stock) and a quantity multiplier associated with the particular market center 18. For example, the quantity multiplier applied by the order matching module 44 for ARCA may be 3× resulting in a trading order 20 routed to ARCA that comprises an offer to sell 18,000 shares of XYZ stock at 10.01. The status 418 of the bid request associated with ARCA is now listed as "Pending" to indicate that the trading order 20 is currently pending with ARCA. In one embodiment, the trading order 20 routed to market centers 18 comprises an IOC trading order 20. In other embodiments, the trading order 20 routed to market centers 18 comprises a type of order determined by size disclosure module 42.

Order matching module 44 determines the quantity multiplier for each market center 18 based upon a current or recent "fill percentage" associated with the market center 18 for the particular trading product. The "fill percentage" may be determined based upon a moving average of the percentage of shares filled by a market center 18 for a particular trading product at a particular price. In particular embodiments, a 3× quantity multiplier is associated with a fill percentage of 83%.

Assuming order matching module 44 applies a quantity multiplier, trading order 20 now has a remaining offer quantity balance of 79,000 shares of XYZ stock (e.g., 97,000 shares–18,000 shares=79,000 shares). Order matching module 44 next determines that ISLD has quoted a bid price 416 of 10.01 for 7,000 shares of XYZ stock, which is higher than Trader 1's target offer price of 9.98. In particular embodiments, order matching module 44 may determine that a particular market center 18 has already received more than a predetermined maximum number of pending trading orders 20 from platform 12. In such a case, platform 12 will not send further trading orders 20 until the current number of pending trading orders 20 associated with that market center 18 falls below the predetermined maximum number allowed. In the example operation described herein, it is assumed that ISLD has exceed the predetermined maximum number of pending trading orders 20 allowed and, therefore, order matching module 44 does not send a trading order 20 to ISLD. The status 418 of the bid request associated with ISLD is therefore listed as "Open".

Order matching module 44 next determines that ARCA has quoted a bid price 416 of 10.00 for 2,000 shares of XYZ stock, which is higher than Trader 1's target offer price of 9.98. In particular embodiments, order matching module 44 may determine that if a particular market center 18 has already received a trading order 20 for a particular trading product, that it will not then send another trading order 20 to that same market center 18 for that same trading product. In other embodiments, order matching module 44 may communicate yet another trading order to the same market center 18 for the same trading product in a quantity equal to the bid quantity 412 or equal to the bid quantity 412 adjusted by the appropriate quantity multiplier. In the example operation described herein, it is assumed that order matching module 44 does not send another trading order 20 to ARCA. The status 418 of the bid request associated with ARCA is therefore listed as "Open".

Order matching module 44 next determines that Trader 4 has submitted a bid request for 50,000 shares of XYZ stock at 10.00, which is higher than Trader 1's target offer price of 9.98. The bid request submitted by Trader 4 is matched with the trading order 20 submitted by Trader 1, resulting in a third matched trading order between Trader 1 and Trader 4 for 50,000 shares of XYZ stock. As described above, the matched price for this matched trading order can be 9.98, 10.00 or any price therebetween. The status 418 of the bid request associated with Trader 4 is listed as "Matched" or, alternatively, the bid request is removed from log 60 to indicate that it has been matched.

The trading order 20 now has a remaining offer quantity balance of 29,000 shares of XYZ stock (e.g., 79,000 shares–50,000 shares=29,000 shares). Order matching module 44 determines that no other bid requests for XYZ stock are stored in log 60. As a result, module 44 stores an offer request in log 60 on behalf of Trader 1 for 29,000 shares of XYZ stock at 9.98.

Although the operation of order matching module 44 has been detailed with reference to matching an offer request with stored bid requests, it should be understood that order matching module 44 may apply similar operational principals in order to match a bid request with stored offer requests.

A particular advantage of order matching module 44 is that it attempts to match incoming trading orders 20 with requests submitted by other traders, where appropriate and possible, so that the order fulfillment process of system 10 is internalized within trading exchange platform 12. When such an order 20 is filled internally within platform 12, order matching module 44 may communicate one or more acknowledgments 402 to the appropriate traders specifying the details of the filled orders. When at least a portion of an incoming trading order 20 is not filled internally, order matching module 44 may communicate one or more trading orders 20 to one or more market centers 18.

Figure 13:
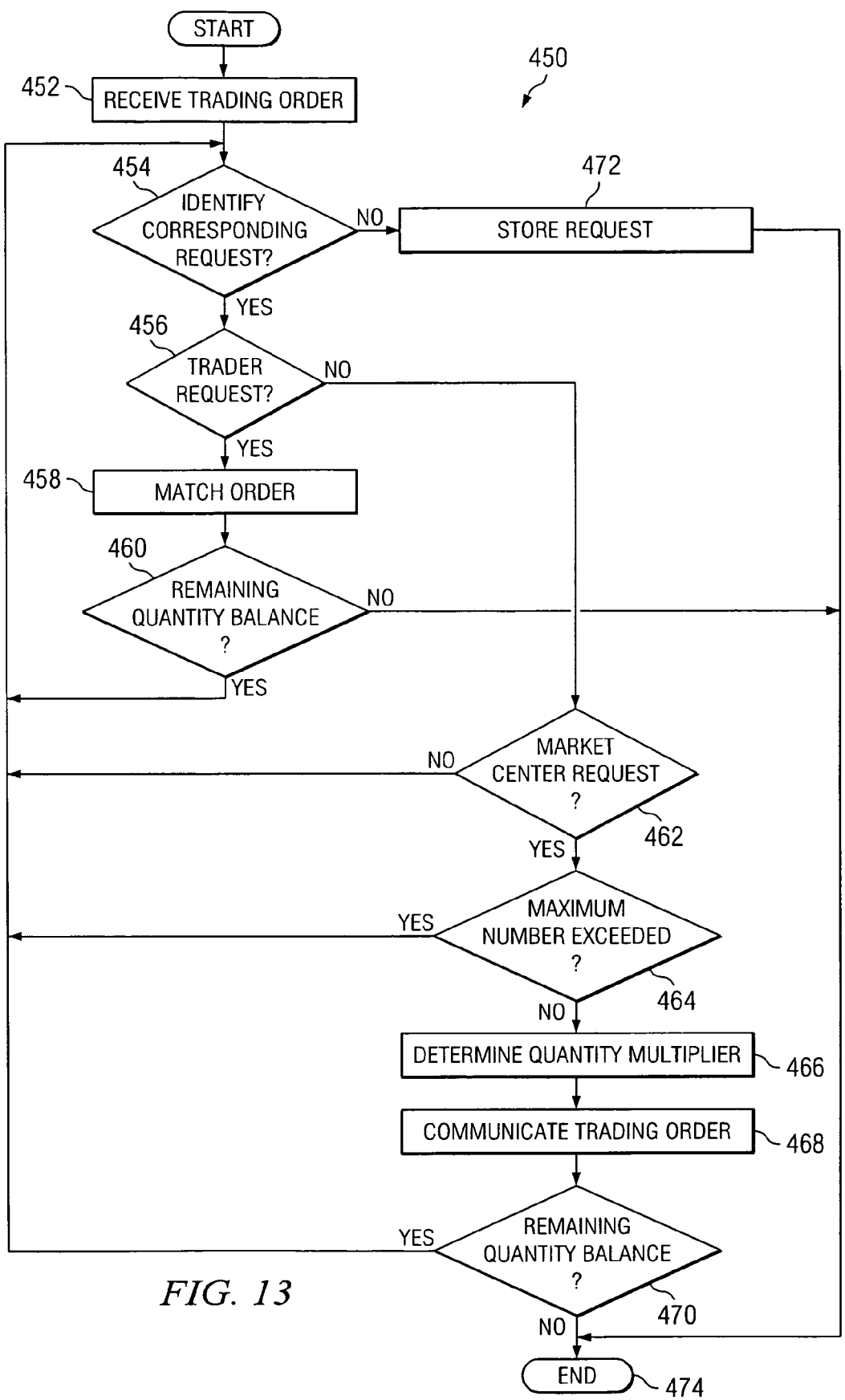
FIG. 13 illustrates a flowchart of an exemplary method for performing order matching.

FIG. 13 illustrates a flowchart 450 of an exemplary method for performing order matching. The method begins at step 452 where module 44 receives a trading order 20 comprising an order to buy a particular quantity of a particular trading product at a target bid price, or an order to sell a particular quantity of a particular trading product at a target offer price. Execution proceeds to step 454 where module 44 determines whether a corresponding request can be identified in order matching log 60. For example, if the trading order 20 comprises an offer request for a particular trading product, then module 44 determines whether a corresponding bid request for the particular trading product may be identified in log 60. If the trading order 20 comprises a bid request for a particular trading product, then module 44 determines whether a corresponding offer request for the particular trading product may be identified in log 60. In particular embodiments where module 44 identifies more than one corresponding request for a particular trading product, execution proceeds with one of the identified requests that have the best price, such as the highest bid price or the lowest offer price.

If a corresponding request is identified at step 454, module 44 determines whether the request is associated with a trader at step 456. If so, execution proceeds to step 458 where module 44 matches the trading order 20 with the request identified at step 454 to form a matched trading order. If a quantity balance of the trading order remains, as determined at step 460, execution returns to step 454 where it is determined whether another corresponding request is identified.

If the request identified at step 454 is not a trader request as determined at step 456, then execution proceeds to step 462 where module 44 determines whether the request is associated with a market center 18. If so, module 44 determines whether the market center 18 has already received more than a predetermined maximum number of pending trading orders 20 from platform 12 at step 464. If so, execution returns to step 454. If not, execution proceeds to step 466 where module 44 determines an appropriate quantity multiplier for the particular market center 18. Module 44 communicates a trading order 20 bound for the particular market center 18 at step 468.

If a quantity balance of the trading order remains, as determined at step 470, execution returns to step 454 where it is determined whether another corresponding request is identified. If another corresponding request is not identified at step 454, execution proceeds to step 472 where various parameters of the trading order 20 are stored as a request in order matching log 60. For example, if the trading order 20 specified a bid request, then module 44 stores a bid request for the remaining quantity balance in log 60 at step 472. If the trading order 20 specified an offer request, then module 44 stores an offer request for the remaining quantity balance in log 60 at step 472. Upon storing the request at step 472 or upon determining that a quantity balance of trading order 20 does not remain at steps 460 or 470, execution proceeds to step 474 where the method terminates.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A method comprising:
    receiving, from a remote device, an order for a quantity of a trading product;
    identifying, using a processor, a plurality of market centers that are able to match the order, in which the processor and the remote device are in communication over a network;
    receiving, at the processor for each market center, a respective price for the order;
    comparing, using the processor, each of the received prices to determine a best price for the order;
    determining, using the processor, a respective best price policy for each market center, in which the respective best price policy indicates an action that is taken by the market center in response to the best price;
    adjusting, using the processor, the received price of each market center in accordance with the respective best price policy of the market center;
    selecting, based on the adjusted price of each market center, via the processor a market center from the plurality of market centers; and
    routing, using the processor, the order to the selected market center.

2. The method of claim 1, in which the order comprises one of:
    a request to buy the quantity of the trading product; and
    a request to sell the quantity of the trading product.

3. The method of claim 1 further comprising:
    determining, using the processor, that the best price policy for at least one of the market centers includes a policy to match the best price; and
    setting, using the processor, the price of the at least one market center to the best price.

4. The method of claim 1 further comprising:
    determining, using the processor, that the best price policy for at least one of the market centers includes a policy to split the best price;
    calculating, using the processor, an average of:
        a best bid price defined by the best price; and
        a best offer price defined by the best price; and
    setting, using the processor, the price of the at least one market center to the calculated average.

5. The method of claim 1, further comprising:
    determining, using the processor, that at least one market center charges a transaction cost; and
    adjusting, using the processor, the price of the at least one market center in accordance with the transaction cost.

6. The method of claim 1 further comprising:
    determining, using the processor, that at least one market center credits a transaction rebate; and
    adjusting, using the processor, the price of the at least one market center in accordance with the transaction rebate.

7. The method of claim 1, in which the act of selecting further comprises:
    determining, using the processor, that the selected market center offers at least one of:
        a highest price for buying the quantity of the trading product, and
        a lowest price for selling the quantity of the trading product.

8. An apparatus comprising:
    a processor; and
    a memory, in which the memory stores instructions which, when executed by the processor, direct the processor to perform the acts of:
    receiving an order for a quantity of a trading product;
    identifying a plurality of market centers that are able to match the order;
    receiving, for each market center, a respective price for the order;
    comparing each of the received prices to determine a best price for the order;
    determining a respective best price policy for each market center, in which the respective best price policy indicates an action that is taken by the market center in response to the best price;
    adjusting the received price of each market center in accordance with the respective best price policy of the market center;
    selecting, based on the adjusted price of each market center a market center from the plurality of market centers; and
    routing the order to the selected market center.

9. The apparatus of claim 8, in which the order comprises one of:
    a request to buy the quantity of the trading product; and
    a request to sell the quantity of the trading product.

10. The apparatus of claim 8, in which the memory stores instructions which, when executed by the processor, direct the processor to perform the acts of:
    determining that the best price policy for at least one of the market centers includes a policy to match the best price; and
    setting the price of the at least one market center to the best price.

11. The apparatus of claim 8, in which the memory stores instructions which, when executed by the processor, direct the processor to perform the acts of:
    determining that the best price policy for at least one of the market centers includes a policy to split the best price;
    calculating an average of:
        a best bid price defined by the best price; and
        a best offer price defined by the best price; and
    setting the price of the at least one market center to the calculated average.

12. The apparatus of claim 8, in which the memory stores instructions which, when executed by the processor, direct the processor to perform the acts of:
    determining that at least one market center charges a transaction cost; and
    adjusting the price of the at least one market center in accordance with the transaction cost.

13. The apparatus of claim 8, in which the memory stores instructions which, when executed by the processor, direct the processor to perform the acts of:
    determining that at least one market center credits a transaction rebate; and
    adjusting the price of the at least one market center in accordance with the transaction rebate.

14. The apparatus of claim 8, in which the memory stores instructions which, when executed by the processor, direct the processor to perform the acts of:
    determining that the selected market center offers at least one of:
        a highest price for buying the quantity of the trading product, and
        a lowest price for selling the quantity of the trading product.

15. An article of manufacture comprising:
    a storage medium, in which the storage medium stores instructions which, when executed by a processor, direct the processor to perform the acts of:
    receiving an order for a quantity of a trading product;
    identifying a plurality of market centers that are able to match the order;
    receiving, for each market center, a respective price for the order;
    comparing each of the received prices to determine a best price for the order;
    determining a respective best price policy for each market center, in which the respective best price policy indicates an action that is taken by the market center in response to the best price;
    adjusting the received price of each market center in accordance with the respective best price policy of the market center;
    selecting, based on the adjusted price of each market center, a market center from the plurality of market centers; and
    routing the order to the selected market center.

16. The article of manufacture of claim 15, in which the order comprises one of:
    a request to buy the quantity of the trading product; and
    a request to sell the quantity of the trading product.

17. The article of manufacture of claim 15, in which the storage medium stores instructions which, when executed by the processor, direct the processor to perform the acts of:
    determining that the best price policy for at least one of the market centers includes a policy to match the best price; and
    setting the price of the at least one market center to the best price.

18. The article of manufacture of claim 15, in which the storage medium stores instructions which, when executed by the processor, direct the processor to perform the acts of:
    determining that the best price policy for at least one of the market centers includes a policy to split the best price;
    calculating an average of:
        a best bid price defined by the best price; and
        a best offer price defined by the best price; and
    setting the price of the at least one market center to the calculated average.

19. The article of manufacture of claim 15, in which the storage medium stores instructions which, when executed by the processor, direct the processor to perform the acts of:
    determining that at least one market center charges a transaction cost; and
    adjusting the price of the at least one market center in accordance with the transaction cost.

20. The article of manufacture of claim 15, in which the storage medium stores instructions which, when executed by the processor, direct the processor to perform the acts of:
    determining that at least one market center credits a transaction rebate; and
    adjusting the price of the at least one market center in accordance with the transaction rebate.

21. The article of manufacture of claim 15, in which the storage medium stores instructions which, when executed by the processor, direct the processor to perform the acts of:
    determining that the selected market center offers at least one of:
        a highest price for buying the quantity of the trading product, and
        a lowest price for selling the quantity of the trading product.

* * * * *